United States Patent
Sarikaya et al.

(10) Patent No.: US 10,957,313 B1
(45) Date of Patent: *Mar. 23, 2021

(54) SYSTEM COMMAND PROCESSING

(71) Applicant: Amazon Technologies, Inc., Seattle, WA (US)

(72) Inventors: Ruhi Sarikaya, Redmond, WA (US); Zheng Ma, Bothell, MA (US); Simon Peter Reavely, Lexington, MA (US); Kerry Hammil, Seattle, WA (US); Huinan Ren, Seattle, WA (US); Bradford Jason Snow, Duvall, WA (US); Jerrin Thomas Elanjikal, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 86 days.

This patent is subject to a terminal disclaimer.

(21) Appl. No.: 15/821,080

(22) Filed: Nov. 22, 2017

Related U.S. Application Data

(63) Continuation-in-part of application No. 15/712,676, filed on Sep. 22, 2017.

(51) Int. Cl.
*G10L 15/22* (2006.01)
*G10L 15/30* (2013.01)
(Continued)

(52) U.S. Cl.
CPC .......... *G10L 15/22* (2013.01); *G06F 40/117* (2020.01); *G10L 15/1815* (2013.01);
(Continued)

(58) Field of Classification Search
CPC ....... G10L 15/22; G10L 15/183; G10L 15/08; G10L 15/1815; G10L 2015/088;
(Continued)

(56) References Cited

U.S. PATENT DOCUMENTS

| 6,785,651 B1 * | 8/2004 | Wang ............... G06F 17/2247 704/246 |
| 7,418,392 B1 * | 8/2008 | Mozer ............... G10L 15/26 315/307 |

(Continued)

OTHER PUBLICATIONS

The Examiner's attention is hereby drawn to the specification and file history of co-pending U.S. Appl. No. 15/712,676, titled "System Command Processing", filed Sep. 22, 2017, which may contain information relevant to the present application.

*Primary Examiner* — Abdelali Serrou
(74) *Attorney, Agent, or Firm* — Pierce Atwood LLP

(57) ABSTRACT

Techniques for performing command processing are described. A system receives, from a device, input data corresponding to a command. The input data may originate as audio data, as text data, or as other data. The system determines NLU processing results corresponding to the input data. The NLU processing results may be associated with multiple speechlets. The system also determines NLU confidences for the NLU processing results for each speechlet. The system sends NLU processing results and an indication to provide potential results to a portion of the multiple speechlets, and receives potential results from the portion of the speechlets. The system also receives indications whether the speechlets need to be re-called if the speechlets are selected to execute with respect to the command. The system ranks the portion of the speechlets based at least in part on the NLU processing results as well as the potential results provided by the portion of the speechlets. The system may also rank the portion of the applications using other data. The system causes content provided by the highest ranked speechlet to be output to a user.

20 Claims, 11 Drawing Sheets

(51) Int. Cl.
  *G10L 15/18* (2013.01)
  *G06F 40/117* (2020.01)
  *G10L 13/00* (2006.01)

(52) U.S. Cl.
  CPC .............. *G10L 15/30* (2013.01); *G10L 13/00* (2013.01); *G10L 2015/223* (2013.01)

(58) Field of Classification Search
  CPC ... G10L 15/30; G10L 2015/223; G10L 15/18; G10L 2015/0635; G10L 15/02; G10L 15/065; G10L 15/10; G10L 15/12; G10L 15/265; G10L 2015/0638; G10L 2015/225; G10L 15/14; G10L 15/1822; G10L 15/32; G10L 2015/228; G10L 15/063; G10L 15/24; G10L 15/00; G10L 15/34; G10L 15/005; G10L 15/01; G10L 15/07; G10L 15/142; G10L 15/193; G10L 15/197; G10L 2015/221; G10L 2015/227; G10L 2021/02082; G10L 21/0232; G10L 25/30; G10L 25/51; G06F 17/2785; G06F 3/167; G06F 16/3329; G06F 17/279; G06F 16/33; G06F 16/3344; G06F 16/90332; G06F 17/20; G06F 17/27; G06F 17/271; G06F 17/2715; G06F 9/451; G06F 9/4843; G06F 9/4881; G06F 9/5083
  See application file for complete search history.

(56) References Cited

U.S. PATENT DOCUMENTS

| | | | |
|---|---|---|---|
| 8,082,153 B2 | 12/2011 | Coffman et al. | |
| 9,361,084 B1 | 6/2016 | Costa | |
| 9,424,840 B1* | 8/2016 | Hart .................... | G10L 15/22 |
| 10,140,973 B1* | 11/2018 | Dalmia ................. | G06F 40/247 |
| 10,235,997 B2* | 3/2019 | Shah ..................... | H04N 5/4403 |
| 10,236,016 B1* | 3/2019 | Li .......................... | H04R 3/00 |
| 10,643,609 B1* | 5/2020 | Pogue .................. | G10L 25/51 |
| 10,692,489 B1* | 6/2020 | Grizzel ................. | G10L 15/22 |
| 2003/0139925 A1 | 7/2003 | Anderson et al. | |
| 2004/0085162 A1* | 5/2004 | Agarwal .............. | G10L 15/22 333/196 |
| 2006/0116877 A1* | 6/2006 | Pickering ............. | G10L 15/08 704/231 |
| 2006/0149558 A1 | 7/2006 | Kahn et al. | |
| 2007/0143099 A1 | 6/2007 | Balchandran et al. | |
| 2008/0032663 A1* | 2/2008 | Doyle .................. | H04H 20/106 455/345 |
| 2010/0031299 A1* | 2/2010 | Harrang ............ | H04N 21/44029 725/80 |
| 2010/0106497 A1* | 4/2010 | Phillips ................ | G10L 15/30 704/231 |
| 2010/0223060 A1 | 9/2010 | Chang et al. | |
| 2012/0296638 A1* | 11/2012 | Patwa .................. | G10L 15/22 704/9 |
| 2013/0152092 A1* | 6/2013 | Yadgar ................. | G10L 15/19 718/102 |
| 2013/0166543 A1* | 6/2013 | MacDonald ........ | G06F 16/9535 707/723 |
| 2013/0275164 A1* | 10/2013 | Gruber ................. | G10L 17/22 705/5 |
| 2013/0339021 A1* | 12/2013 | Deshmukh .......... | G10L 15/18 704/257 |
| 2014/0019873 A1 | 1/2014 | Gupta et al. | |
| 2015/0249882 A1* | 9/2015 | Patil .................... | G06F 3/04842 381/123 |
| 2015/0317302 A1* | 11/2015 | Liu ..................... | G06F 16/90332 704/9 |
| 2016/0042748 A1 | 2/2016 | Jain et al. | |
| 2016/0154783 A1* | 6/2016 | Hebert ................. | G06F 40/205 707/755 |
| 2016/0154792 A1* | 6/2016 | Sarikaya ............. | G06F 40/35 704/9 |
| 2016/0180853 A1 | 6/2016 | VanLund et al. | |
| 2016/0196499 A1* | 7/2016 | Khan .................... | G06N 5/048 706/52 |
| 2017/0083285 A1* | 3/2017 | Meyers ................ | G10L 15/00 |
| 2017/0236512 A1 | 8/2017 | Williams et al. | |
| 2017/0263255 A1* | 9/2017 | Jeong .................. | G10L 15/183 |

* cited by examiner

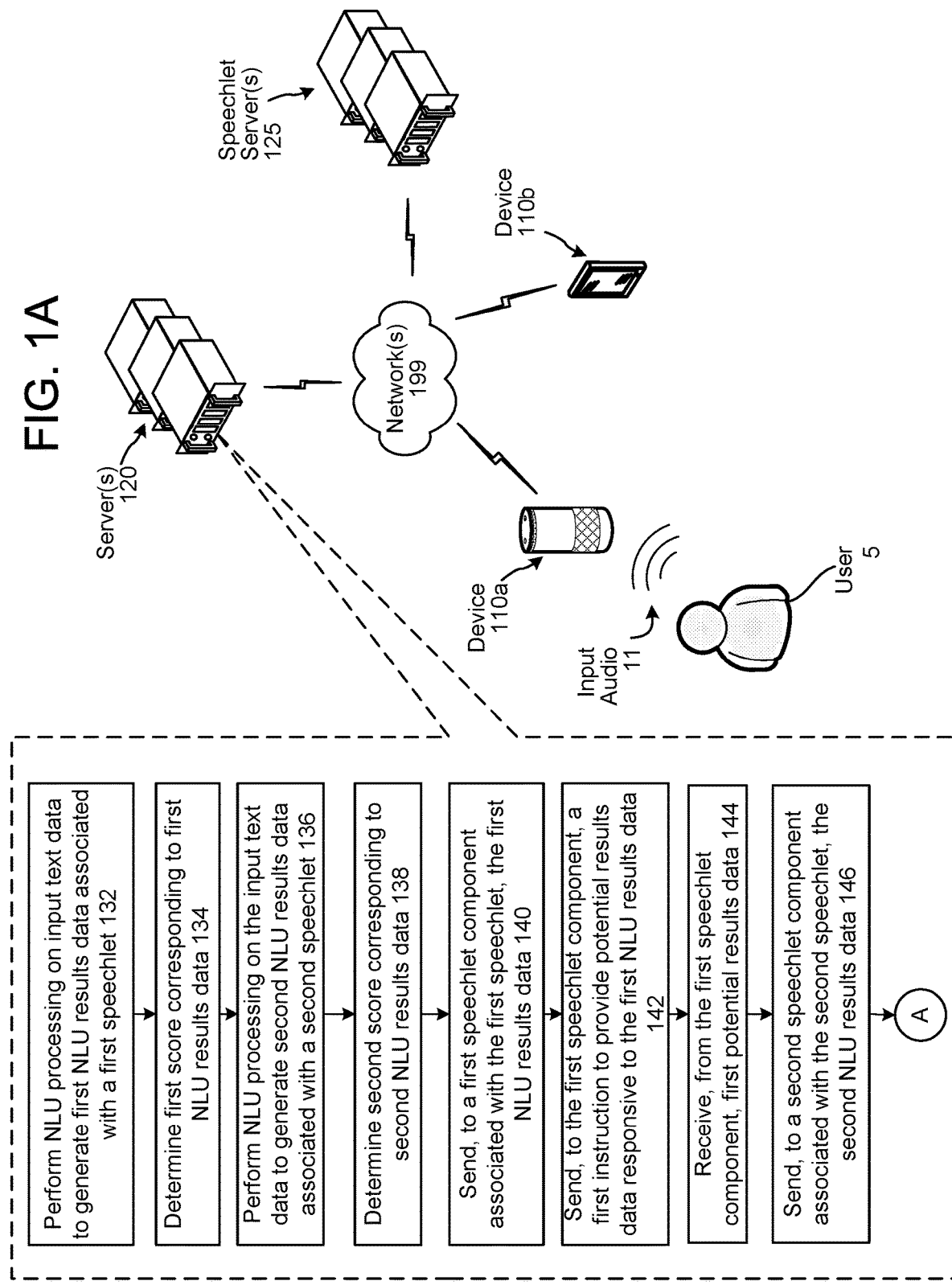

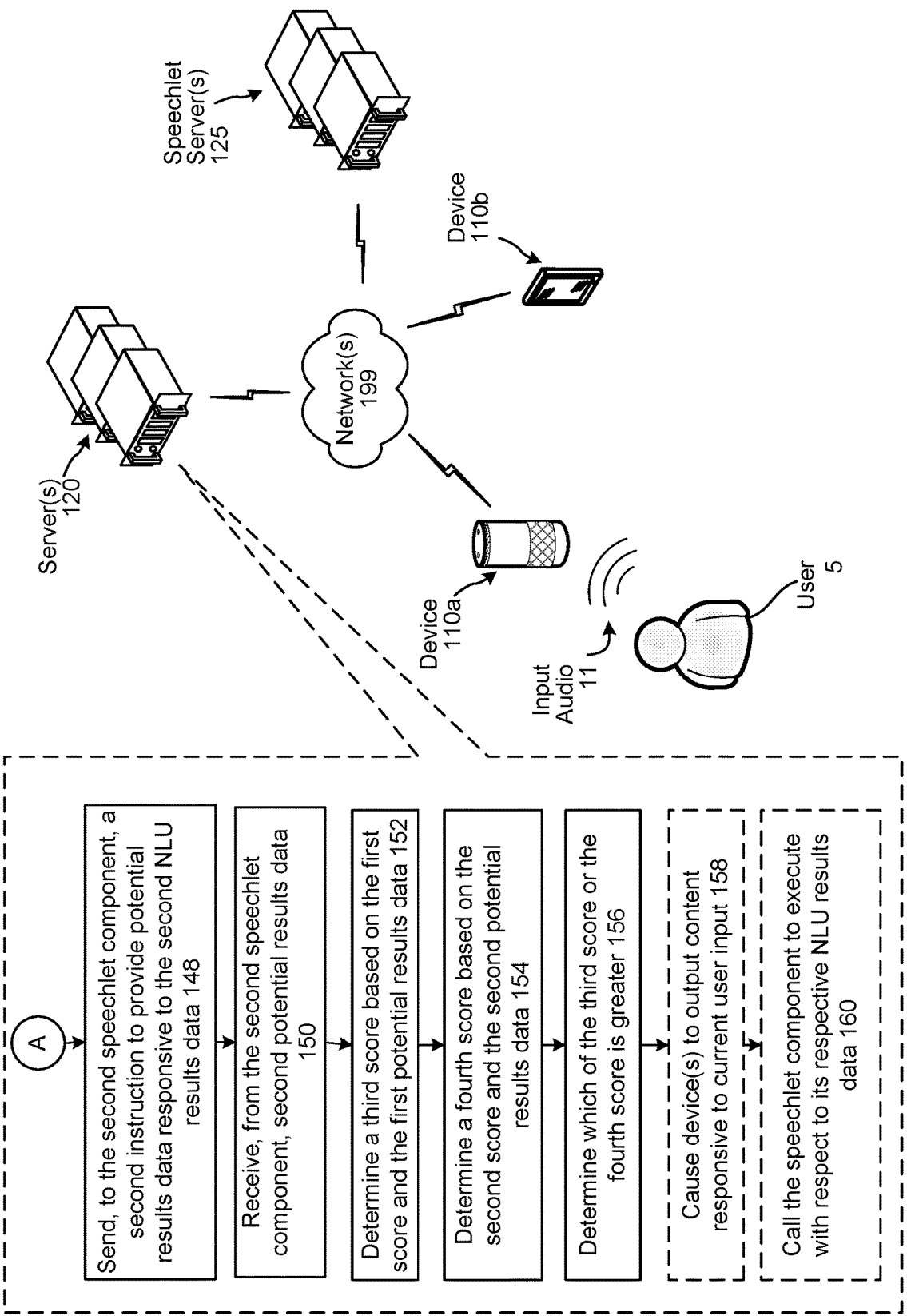

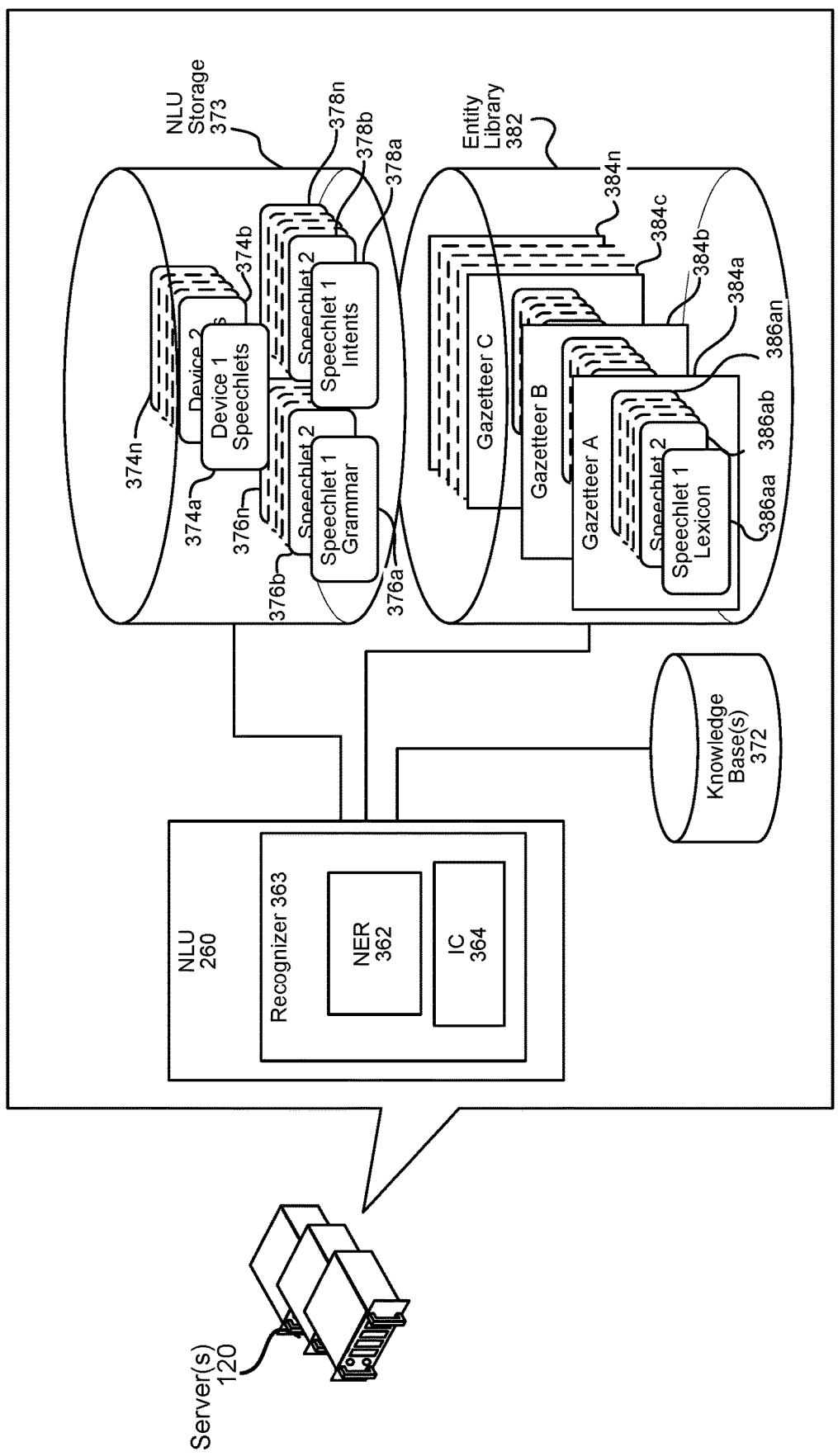

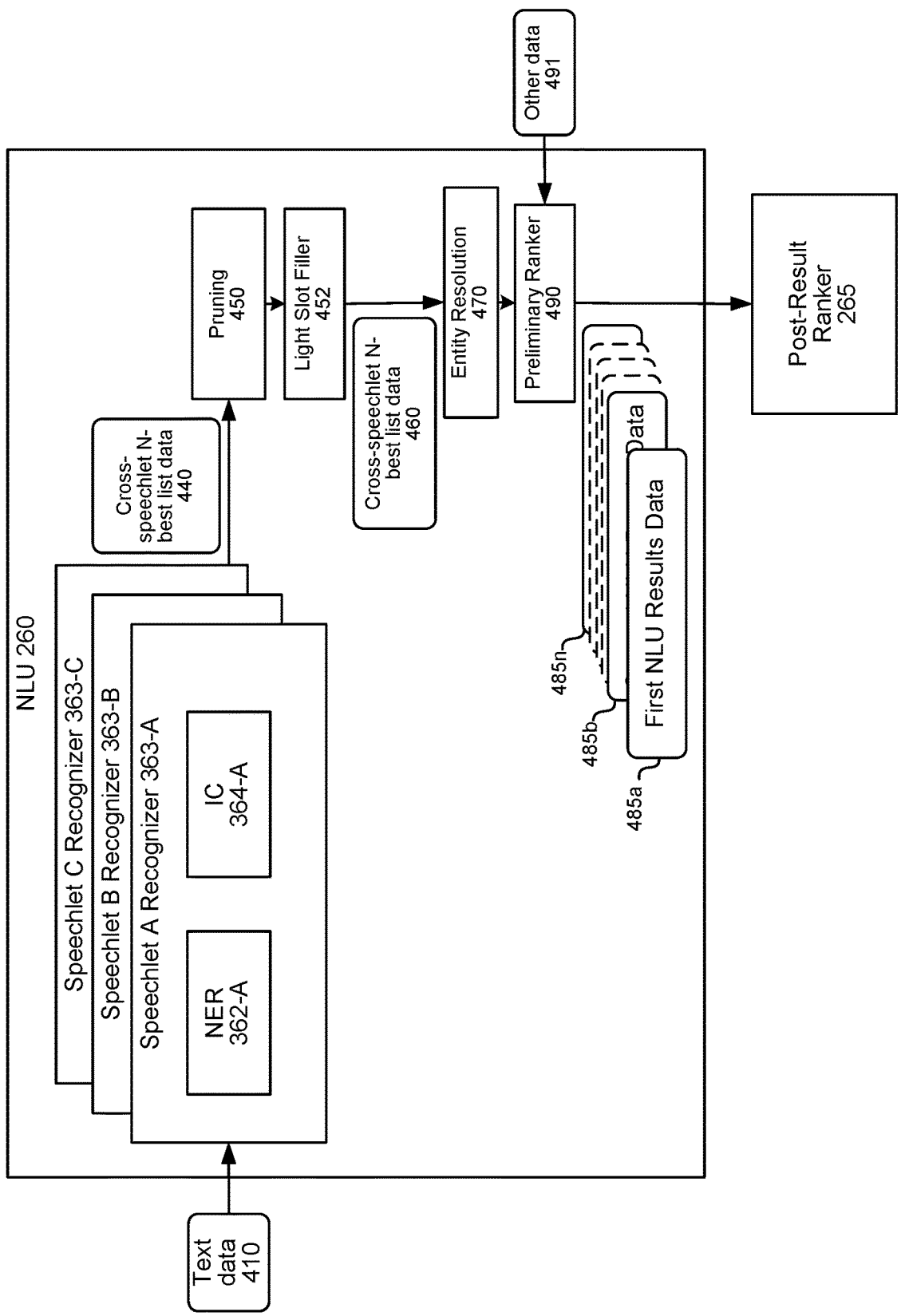

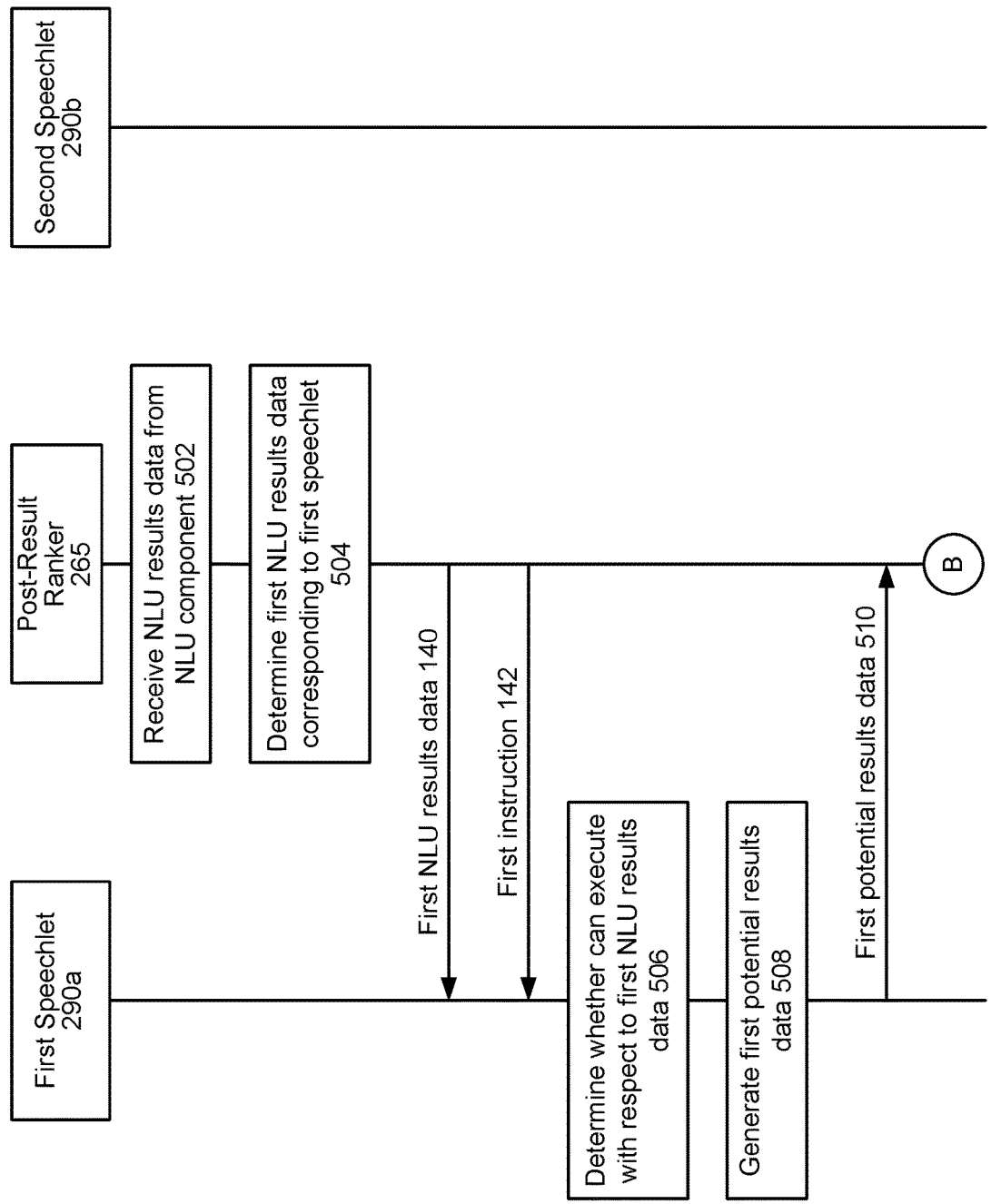

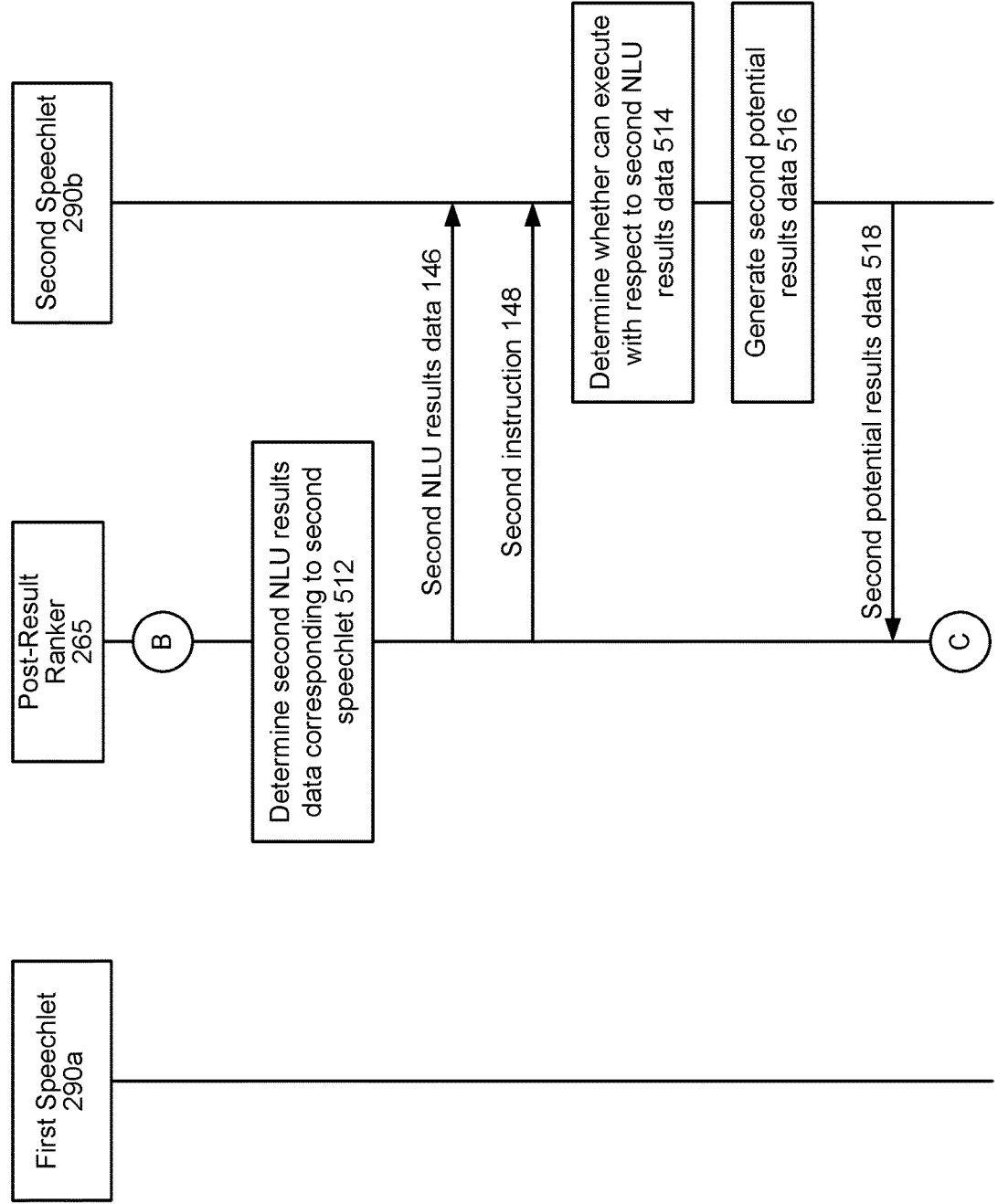

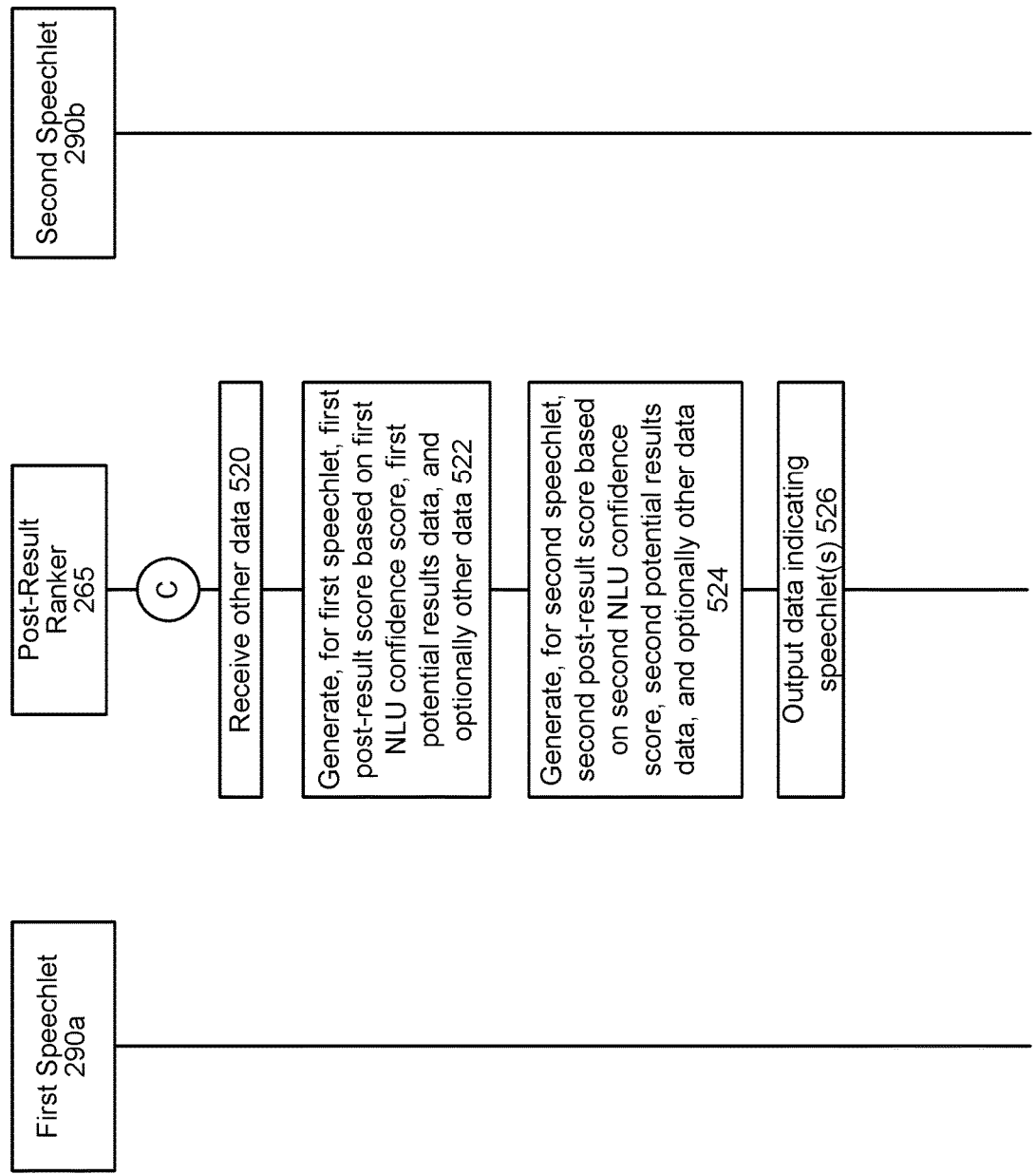

SYSTEM COMMAND PROCESSING

CROSS-REFERENCE TO RELATED APPLICATION DATA

This application is a Continuation-in-Part of U.S. patent application Ser. No. 15/712,676, entitled "System Command Processing," filed on Sep. 22, 2017, in the names of Ruhi Sarikaya et al. The above patent application is herein incorporated by reference in its entirety.

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is referred to herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIGS. 1A and 1B illustrate a system configured to select a speechlet to execute with respect to user input according to embodiments of the present disclosure.

FIG. 3 is a conceptual diagram of how natural language understanding processing is performed according to embodiments of the present disclosure.

FIG. 4 is a conceptual diagram of how natural language understanding processing is performed according to embodiments of the present disclosure.

FIGS. 5A through 5C are a signal flow diagram illustrating operation of a post-result ranker component according to embodiments of the present disclosure.

DETAILED DESCRIPTION

Figure 2:
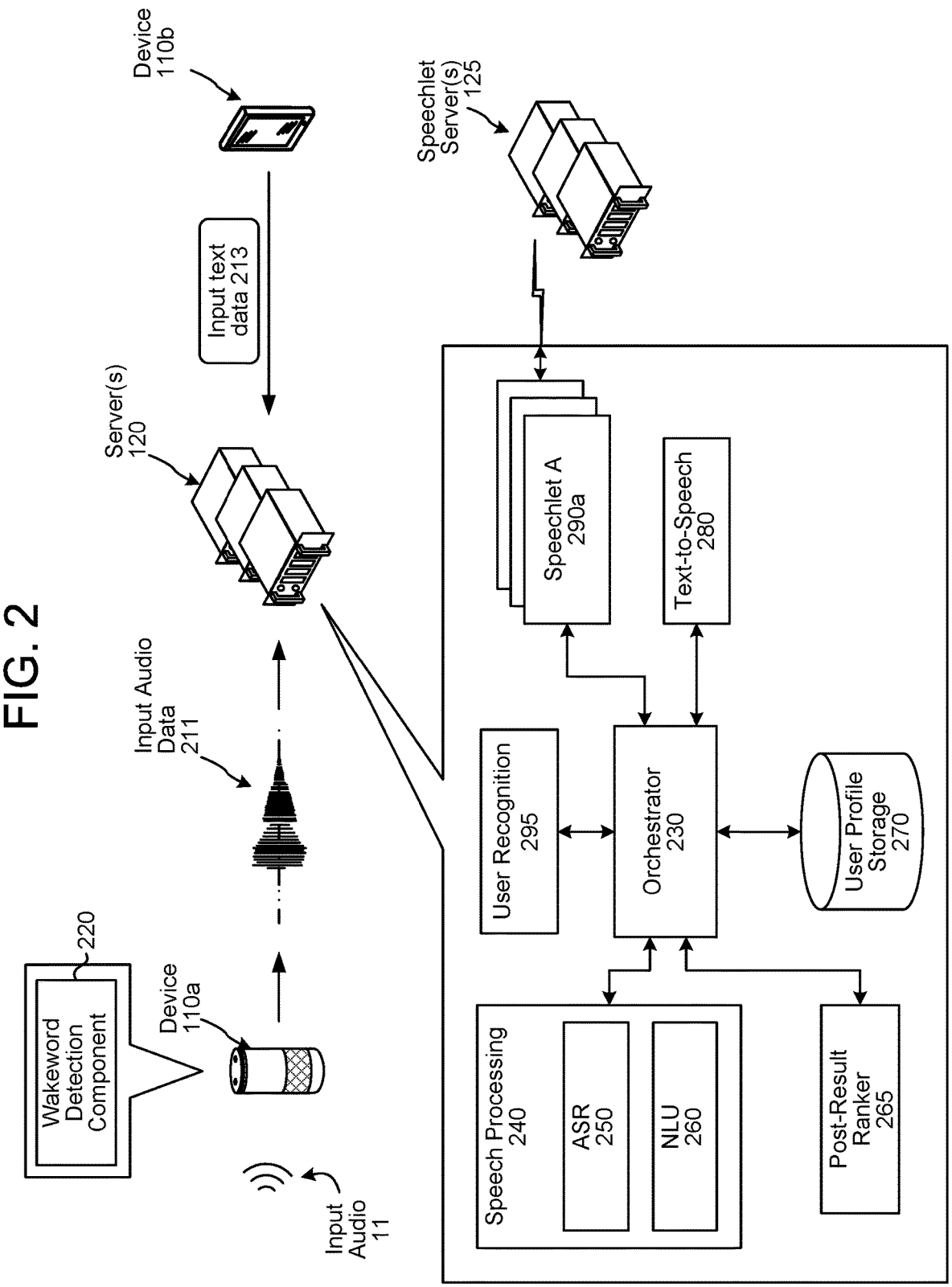
FIG. 2 is a conceptual diagram of components of a system according to embodiments of the present disclosure.

Automatic speech recognition (ASR) is a field of computer science, artificial intelligence, and linguistics concerned with transforming audio data associated with speech into text data representative of that speech. Natural language understanding (NLU) is a field of computer science, artificial intelligence, and linguistics concerned with enabling computers to derive meaning from text input containing natural language. Text-to-speech (TTS) is a field of computer science, artificial intelligence, and linguistics concerned with enabling computers to output synthesized speech. ASR, NLU, and TTS may be used together as part of a speech processing system.

A computing system may answer user inputs requesting information or other content. For example, a user may say "Alexa, what is the weather." In response, the system may output weather information. For further example, a user may say "Alexa, play Adele." In response, the system may output music sang by Adele.

The system may be configured with multiple speechlets (e.g., thousands) that can be used to potentially respond to a user command. Further, the system may be capable of operating many different speechlets that have an overlapping subject matter and/or overlapping functionality. For example, the system may include more than one music speechlet that may execute with respect to a single user input requesting the output of music. Determining which speechlet should be selected to execute with respect to a single user input is a non-trivial problem.

The system may determine, in parallel, which of the entirety of the system's speechlets may potentially execute with respect to a user input. For example, when the system receives user input, the system may determine, for each speechlet, the portions of the user input that may be relevant to the speechlet's execution of the user input as well as one or more intents related to the particular speechlet to which the user input potentially relates.

The system may generate, for each speechlet (or for a subset of speechlets), a confidence score indicating a likelihood that the speechlet can execute a command with respect to the user input. Based on the confidence scores assigned to multiple speechlets of the system, the system may select a single speechlet from which to obtain output content responsive to the user input.

In some situations, multiple speechlets may be associated with similar confidence scores even though some of the speechlets may not be able to execute with respect to the user input. The system may select a speechlet to obtain output content from even though the speechlet may not be able to provide output content responsive to the user input. In certain systems, the selection of a single speechlet is made prior to actually obtaining the output content from the selected speechlet. This is due to a number of different reasons including latency, conservation of computing resources, etc.

The present disclosure improves such computing systems by incorporating the respective speechlets' potential output content when disambiguating which speechlet to select for responding to the user input. Thus, the system may increase the likelihood that the system will select the appropriate speechlet that can provide output content most responsive to the user input.

Prior to selecting a particular speechlet from which to obtain output content that will be presented to the user, the system sends NLU results to a number of different speechlets and obtains from those speechlets at least partial output content. The system can then consider that output content to determine post-result scores for the respective speechlets and then use those post-result scores to select from among the speechlets to actually respond to the user input.

In some instances, user input may request the system perform an action, such as order a pizza, book a ride, etc. Since the system does not select a single speechlet until after the system has been able to consider potential responses to the user input provided by speechlets, the system may send, in addition to sending NLU results, instructions to the speechlets to provide the system with potential results without affirmatively executing with respect to the NLU results. Thus, for example, if a user input corresponds to a request for the system to book a ride, the system may send ride sharing speechlets NLU results as well as instructions to provide the system with information regarding whether the speechlets can book the requested ride without actually booking the requested ride.

A queried speechlet may provide the system with various indications, such as yes (e.g., meaning the speechlet can execute with respect to the user input, no (e.g., meaning the speechlet cannot execute with respect to the user input, or maybe (e.g., meaning the speechlet is unsure whether it can execute with respect to the user input, for example in the situation where the speechlet may need more information to make a decision). In addition or alternatively to providing the system with an indication, a speechlet may provide the system with partial or complete results data that the speechlet would produce in response to the user input. For example, a speechlet may send the system content that may be presented to a user, such as when the user input corresponds to a request for the output of music.

The system may alter the originally generated confidence scores for the queried speechlets based on the information provided by queried speechlets. Based on the altered confidence scores, the system may select a single, most appropriate, speechlet to execute with respect to the user input. The system then calls the selected speechlet to affirmatively execute to provide a response to the user input.

FIGS. 1A and 1B illustrate a system configured to select a speechlet to execute with respect to user input. Although the figures and discussion illustrate certain operational steps of the system in a particular order, the steps described may be performed in a different order (as well as certain steps removed or added) without departing from the intent of the disclosure. Devices (110a/110b) local to a user 5, one or more server(s) 120, and one or more speechlet server(s) 125 may communicate across one or more networks 199.

The device 110a may receive input audio 11 corresponding to a spoken utterance originating from the user 5. The device 110a generates input audio data corresponding to the input audio 11 and sends the input audio data to the server(s) 120.

Alternatively, the device 110b may receive input from the user 5 corresponding to text via a touch screen providing a virtual keyboard. The device 110b may generate input text data corresponding to the input text. The device 110b may send the input text data to the server(s) 120 via a companion application operating on the device 110b and in communication with the server(s) 120.

The server(s) 120 performs natural language understanding (NLU) processing on input text data. The NLU processing may be with respect to multiple speechlets 290 of the system, thus generating different NLU results data depending on which speechlet 290 the system is evaluating the input text data with respect to. The server(s) 120 may receive the input text data from the device 110b. Alternatively, the server(s) 120 may perform automatic speech recognition (ASR) processing on input audio data, received from the device 110a, to generate the input text data.

The server(s) 120 performs (132) NLU processing on the input text data to generate first NLU results data associated with a first speechlet. The server(s) 120 also determines (134) a first score corresponding to the first NLU results data. The first score may correspond to a confidence of the system in the NLU processing used to generate the first NLU results data or may correspond to some other score for the first NLU results data.

In addition, the server(s) 120 performs (136) NLU processing on the input text data to generate second NLU results data associated with a second speechlet. The server(s) 120 also determines (138) a second score corresponding to the second NLU results data. The second score may correspond to a confidence of the system in the NLU processing used to generate the second NLU results data or may correspond to some other score for the second NLU results data.

The server(s) 120 sends (140) the first NLU results data to a first speechlet component (e.g., speechlet server(s) 125, a speechlet component located within server(s) 120, or the like) associated with the first speechlet. The server(s) 120 also sends (142), to the first speechlet component, an instruction to provide potential results data responsive to the first NLU results data.

The system may include speechlets that provide the system data in response to receiving NLU results data, which the system outputs to the user. Examples of such speechlets include weather speechlets (e.g., that provide the system with weather information), music speechlets (e.g., that provide the system with audio data corresponding to music), video speechlets (e.g., that provide the system with multimedia data), etc. These speechlets may interpret the instruction to provide potential output data as a request for an indication regarding whether the speechlet can execute with respect to received NLU results data. Such an indication provided by such a speechlet may correspond to "yes," "no," or "need more information." These speechlets may also or alternatively interpret the instruction as a request for partial or complete output data that is responsive to the received NLU results data. Such potential output data may correspond to text data representing weather information, audio data corresponding to music, etc. In this way a speechlet may provide the system with a version of what the speechlet's output would be if it were called upon to actually execute the user's command.

The system may also include speechlets that, themselves, perform actions responsive to user input. Examples of such speechlets include ride sharing speechlets (e.g., that book ride sharing rides), flight purchasing speechlets (e.g., that purchase flight tickets), pizza ordering speechlets (e.g., that order pizzas through electronic ordering systems), etc. These speechlets may interpret the instruction to provide potential output data as an instruction for the speechlet to execute certain logic without performing a resulting action. In response to the instruction, such a speechlet may provide data indicating whether the speechlet can execute with respect to received NLU results data. Such an indication provided by the speechlet may correspond to "yes," "no," or "need more information." In addition, such a speechlet may provide data indicating what the speechlet would do with respect to the NLU results data, without actually performing the action. For example, a pizza ordering speechlet may provide data indicating the pizza ordering speechlet would request toppings information and delivery address information, and thereafter place an order for a pizza, without the pizza ordering speechlet actually placing the pizza order in response to receiving the NLU results data. As detailed herein, the server(s) 120 may not choose a particular speechlet for handling current user input until after the server(s) 120 receives potential responses to the instruction from the speechlets. Thus, whereas there is no harm if a speechlet provides the system with text data or audio data even if the speechlet is not ultimately chosen to handle the current user input, there may be undesirable effects from a speechlet performing some resulting action (e.g., book a ride, purchase a flight ticket, order a pizza, etc.) in response to receiving the instruction if the speechlet is not ultimately chosen to handle the current user input.

After the server(s) 120 sends the first NLU results data and the first instruction, the server(s) 120 receives (144) first potential results data from the first speechlet component. Depending on whether the first speechlet component is configured to provide the server(s) 120 with content outputtable to a user (e.g., a weather information speechlet component) or is configured to perform an action in response to NLU results data (e.g., a ride sharing speechlet component that books rides in response to NLU results data), the first potentials results data may indicate whether the first speechlet component can execute with respect to the first NLU results data and/or may include potential output data responsive to the first NLU results data.

Moreover, the server(s) 120 sends (146) the second NLU results data to a second speechlet component associated with the second speechlet. The server(s) 120 also sends (148), to the second speechlet component, an instruction to provide potential results data responsive to the second NLU results data. After the server(s) 120 sends the second NLU results data and the second instruction, the server(s) 120 receives (150) second potential results data from the second speechlet component. Depending on whether the second speechlet component is configured to provide the server(s) 120 with content outputtable to a user (e.g., a weather information speechlet component) or is configured to perform an action in response to NLU results data (e.g., a ride sharing speechlet component that books rides in response to NLU results data), the second potentials results data may indicate whether the second speechlet component can execute with respect to the second NLU results data and/or may include potential output data responsive to the second NLU results data.

The server(s) 120 determines (152) a third score based on the first score, representing the system's confidence in the first NLU results data, and the first potential results data. The third score represents the system's confidence that the first speechlet component should be chosen to handle the current user input. The server(s) 120 also determines (154) a fourth score based on the second score, representing the system's confidence in the second NLU results data, and the second potential results data. The fourth score represents the system's confidence that the second speechlet component should be chosen to handle the current user input.

The server(s) 120 determines (156) which of the third score or the fourth score is greater. If the speechlet component associated with the higher score provided the system with potential output data (e.g., text data or audio data corresponding to content responsive to the current user input) in response to receiving the instruction from the server(s) 120, the server(s) 120 may simply cause (158) one or more of the devices (110a/110b) to output content corresponding to the potential output data. By sending already received output content to the device(s) (110a/110b), the server(s) 120 does not need to reengage the highest ranked speechlet, thereby allowing for latency mitigation. Alternatively, if the speechlet component associated with the higher score only provided the system with an indication of whether the speechlet component could handle the current user input, the server(s) 120 may call (160) the speechlet component to execute with respect to its respective NLU results data. Such a call may cause a ride sharing speechlet to book a ride, a music speechlet to provide the system with output audio data corresponding to music, etc.

As described, the server(s) 120 may perform NLU processing to generate speechlet specific NLU results data. The server(s) 120 may then send the speechlet specific NLU results data to respective speechlet components. Alternatively, the server(s) 120 may perform NLU processing to generate NLU results data, and send the same NLU results data to various speechlet components. In this manner, the server(s) 120 may determine which speechlet may handle the same NLU results data in the best manner.

The system may operate using various components as described in FIG. 2. The various components may be located on a same or different physical devices. Communication between various components may occur directly or across a network(s) 199.

The device 110a may receive input audio 11, corresponding to a spoken utterance, using an audio capture component, such as a microphone or array of microphones. The device 110a, using a wakeword detection component 220, processes audio data corresponding to the input audio 11 to determine if a wakeword is detected in the audio data. Following detection of a wakeword, the device 110a sends input audio data 211 to the server(s) 120.

Upon receipt by the server(s) 120, the input audio data 211 may be sent to an orchestrator component 230. The orchestrator component 230 may include memory and logic that enables the orchestrator component 230 to transmit various pieces and forms of data to various components of the system.

The orchestrator component 230 sends the input audio data 211 to a speech processing component 240. An ASR component 250 of the speech processing component 240 transcribes the input audio data 211 into input text data representing one more hypotheses representing speech contained in the input audio data 211. The ASR component 250 interprets the speech in the input audio data 211 based on a similarity between the speech and pre-established language models. For example, the ASR component 250 may compare the input audio data 211 with models for sounds (e.g., subword units, such as phonemes, etc.) and sequences of sounds to identify words that match the sequence of sounds of the speech represented in the input audio data 211. The ASR component 250 sends the input text data generated thereby to an NLU component 260 of the speech processing component 240. The input text data sent from the ASR component 250 to the NLU component 260 may include a top scoring hypothesis or may include an N-best list including multiple hypotheses. An N-best list may additionally include a respective score associated with each hypothesis represented therein. Each score may indicate a confidence of ASR processing performed with respect to the hypothesis with which it is associated.

Alternatively, the device 110b may send input text data 213 to the server(s) 120. Upon receipt by the server(s) 120, the input text data 213 may be sent to the orchestrator component 230. The orchestrator component 230 may send the input text data 213 to the NLU component 260.

The NLU component 260 attempts to make a semantic interpretation of the phrases or statements represented in the input text data input therein. That is, the NLU component 260 determines one or more meanings associated with the phrases or statements represented in the input text data based on individual words represented in the input text data. The NLU component 260 determines an intent represented in the input text data (e.g., an action that a user desires be performed) as well as pertinent pieces of information in the input text data that allow a device (e.g., the device 110a, the device 110b, the server(s) 120, a speechlet 290, the skill server(s) 125, etc.) to execute the intent. For example, if the input text data corresponds to "play Adele," the NLU component 260 may determine a user intended the system to output music sung by Adele.

The system may include a post-result ranker component 265 that selects which speechlet 290 is to execute with respect to a current user input. The post-result ranker component 265 is described in further detail below.

The server(s) 120 may include a user recognition component 295. The user recognition component 295 may take as input the input audio data 211 and/or input text data output by the ASR component 250. The user recognition component 295 determines scores indicating whether user input originated from a particular user. For example, a first score may indicate a likelihood that the user input originated from a first user, a second score may indicate a likelihood that the user input originated from a second user, etc. The user recognition component 295 also determines an overall confidence regarding the accuracy of user recognition operations. The user recognition component 295 may perform user recognition by comparing audio characteristics in the input audio data 211 to stored audio characteristics of users. The user recognition component 295 may also perform user recognition by comparing biometric data (e.g., fingerprint data, iris data, etc.) received by the system in correlation with the present user input to stored biometric data of users. The user recognition component 295 may further perform user recognition by comparing image data (e.g., including a representation of at least a feature of a user) received by the system in correlation with the present user input with stored image data (e.g., including representations of features of users). The user recognition component 295 may perform additional user recognition processes, including those known in the art. Output of the user recognition component 295 may be used to inform NLU processing as well as processing performed by speechlets 290.

The server(s) 120 may include a user profile storage 270. The user profile storage 270 may include a variety of information related to individual users, groups of users, etc. that interact with the system. The user profile storage 270 may include one or more customer profiles. Each customer profile may be associated with a different customer identifier (ID). A customer profile may be an umbrella profile specific to a group of users. That is, a customer profile encompasses two or more individual user profiles, each associated with a respective unique user ID. For example, a customer profile may be a household profile that encompasses user profiles associated with multiple users of a single household. A customer profile may include preferences shared by all the user profiles encompassed thereby. Each user profile encompassed under a single customer profile may include preferences specific to the user associated therewith. That is, each user profile may include preferences unique from one or more other user profiles encompassed by the same customer profile. A user profile may be a stand-alone profile or may be encompassed under a customer profile. As illustrated, the user profile storage 270 is implemented as part of the server(s) 120. However, one skilled in the art will appreciate that the user profile storage 270 may be in communication with the server(s) 120, for example over the network(s) 199.

The server(s) 120 may also include one or more speechlets 290. A "speechlet" may be software running on the server(s) 120 that is akin to a software application running on a traditional computing device. That is, a speechlet 290 may enable the server(s) 120 to execute specific functionality in order to provide data or produce some other output requested by a user. The server(s) 120 may be configured with more than one speechlet 290. For example, a weather service speechlet may enable the server(s) 120 to provide weather information, a car service speechlet may enable the server(s) 120 to book a trip with respect to a taxi or ride sharing service, an order pizza speechlet may enable the server(s) 120 to order a pizza with respect to a restaurant's online ordering system, etc. A speechlet 290 may operate in conjunction between the server(s) 120 and other devices such as a local device 110 in order to complete certain functions. Inputs to a speechlet 290 may come from speech processing interactions or through other interactions or input sources. A speechlet component/device may include hardware, software, firmware, or the like that may be dedicated to the particular speechlet or shared among different components. The speechlet component may be part of the server(s) 120 (for example as speechlet 290) or may be located at whole (or in part) with separate speechlet server(s) 125. Speechlet server(s) 125 may communicate with speechlets 290 within the server(s) 120 and/or directly with the orchestrator 230 or with other components. For present purposes, unless expressly stated otherwise, reference to a speechlet, speechlet device, or speechlet component (such as speechlet 290) may include a speechlet component operating within server(s) 120 and/or speechlet operating within speechlet server(s) 125.

A speechlet 290 may be configured to perform one or more actions. An ability to perform such an action may sometimes be referred to as a "skill." That is, a skill may enable a speechlet component to execute specific functionality in order to provide data or produce some other output requested by a user. A particular speechlet component may be configured to execute more than one skill/action. For example, a weather service skill may involve a speechlet component providing weather information to the server(s) 120, a car service skill may involve a speechlet component booking a trip with respect to a taxi or ride sharing service, an order pizza skill may involve a speechlet component ordering a pizza with respect to a restaurant's online ordering system, etc.

A speechlet(s) 290 may be in communication with one or more speechlet servers 125 implementing different types of skills. Types of skills include home automation skills (e.g., skills that enable a user to control home devices such as lights, door locks, cameras, thermostats, etc.), entertainment device skills (e.g., skills that enable a user to control entertainment devices such as smart TVs), video skills, flash briefing skills, as well as custom skills that are not associated with any pre-configured type of skill.

A speechlet 290 may provide the server(s) 120 with text data to be output as audio to the user 5. The server(s) 120 may include a text-to-speech (TTS) component 280 that generates audio data from text data using one or more different methods. In one method of synthesis called unit selection, the TTS component 280 matches text data against a database of recorded speech. The TTS component 280 selects matching units of recorded speech and concatenates the units together to form output audio data. In another method of synthesis called parametric synthesis, the TTS component 280 varies parameters such as frequency, volume, and noise to create output audio data including an artificial speech waveform. Parametric synthesis uses a computerized voice generator, sometimes called a vocoder.

FIG. 3 illustrates how NLU processing is performed on input text data. Generally, the NLU component 260 attempts to make a semantic interpretation of text represented in text data input thereto. That is, the NLU component 260 determines the meaning behind text represented in text data based on the individual words and/or phrases. The NLU component 260 interprets text to derive an intent or a desired action from the user as well as the pertinent pieces of information in the text that allow a device (e.g., the device 110a, the device 110b, the server(s) 120, etc) to complete that action. For example, if the NLU component 260 receives text data including text corresponding to "tell me the weather," the NLU component 260 may determine that the user intends the system to output weather information.

The NLU component 260 may process text data including several hypotheses of a single utterance. For example, if the ASR component 250 outputs text data including an N-best list of hypotheses, the NLU component 260 may process the text data with respect to all (or a portion of) the hypotheses represented therein.

The NLU component 260 may annotate text represented in text data by parsing and/or tagging the text. For example, for the text "tell me the weather for Seattle," the NLU component 260 may tag "tell me the weather for Seattle" as an intent to output weather information as well as tag "Seattle" as a location for the weather information.

The NLU component 260 may include one or more recognizers 363. Each recognizer 363 may be associated with a different speechlet 290. Each recognizer 363 may process with respect to text data input to the NLU component 260. Each recognizer 363 may operate in parallel with other recognizers 363 of the NLU component 260.

Each recognizer 363 may include a named entity recognition (NER) component 362. The NER component 362 attempts to identify grammars and lexical information that may be used to construe meaning with respect to text represented in text data input therein. The NER component 362 identifies portions of text represented in text data input into the NLU component 260 that correspond to a named entity that may be applicable to processing performed by a speechlet 290 associated with the recognizer 363 implementing the NER component 362. The NER component 362 (or other component of the NLU component 260) may also determine whether a word refers to an entity that is not explicitly mentioned in the text, for example "him," "her," "it" or other anaphora, exophora or the like.

Each recognizer 363, and more specifically each NER component 362, may be associated with a particular grammar model and/or database 376, a particular set of intents/actions 378, and a particular personalized lexicon 386. Each gazetteer 384 may include speechlet-indexed lexical information associated with a particular user and/or device. For example, a Gazetteer A (384a) includes speechlet-index lexical information 386aa to 386an. A user's music speechlet lexical information might include album titles, artist names, and song names, for example, whereas a user's contact list speechlet lexical information might include the names of contacts. Since every user's music collection and contact list is presumably different, this personalized information improves entity resolution.

An NER component 362 applies grammar models 376 and lexical information 386 associated with the speechlet 2909 (associated with the recognizer 363 implementing the NER component 362) to determine a mention of one or more entities in text data input therein. In this manner, the NER component 362 identifies "slots" (i.e., one or more particular words in text data) that may be needed for later processing. The NER component 362 may also label each slot with a type (e.g., noun, place, city, artist name, song name, etc.).

Each grammar model 376 includes the names of entities (i.e., nouns) commonly found in speech about the particular speechlet 290 (i.e., generic terms) to which the grammar model 376 relates, whereas the lexical information 386 is personalized to the user and/or the device from which the input audio data 211 or input text data 213 originated. For example, a grammar model 376 associated with a shopping speechlet may include a database of words commonly used when people discuss shopping.

A downstream process called named entity resolution actually links a portion of text data to an actual specific entity known to the system. To perform named entity resolution, the NLU component 260 may utilize gazetteer information (384a-384n) stored in an entity library storage 382. The gazetteer information 384 may be used to match text represented in text data with different entities, such as song titles, contact names, etc. Gazetteers 284 may be linked to users (e.g., a particular gazetteer may be associated with a specific user's music collection), may be linked to certain speechelts (e.g., a shopping speechlet, a music speechlet, a video speechlet, a communications speechlet, etc.), or may be organized in a variety of other ways.

Each recognizer 363 may also include an intent classification (IC) component 364. An IC component 364 parses text data input thereto to determine an intent(s) associated with the speechlet 290 (associated with the recognizer 363 implementing the IC component 364) that potentially corresponds to the user input represented in the text data. An intent corresponds to an action to be performed that is responsive to the user input represented in the text data. An IC component 364 may communicate with a database 378 of words linked to intents. For example, a music intent database may link words and phrases such as "quiet," "volume off," and "mute" to a <Mute> intent. An IC component 364 identifies potential intents by comparing words and phrases in input text data to the words and phrases in an intents database 378 associated with the speechlet 290 that is associated with the recognizer 363 implementing the IC component 364.

The intents identifiable by a specific IC component 364 are linked to speechlet-specific (i.e., the speechlet 290 associated with the recognizer 363 implementing the IC component 364) grammar frameworks 376 with "slots" to be filled. Each slot of a grammar framework 376 corresponds to a portion of the text data that the system believes corresponds to an entity. For example, a grammar framework 376 corresponding to a <PlayMusic> intent may correspond to text data sentence structures such as "Play {Artist Name}," "Play {Album Name}," "Play {Song name}," "Play {Song name} by {Artist Name}," etc. However, to make resolution more flexible, grammar frameworks 376 may not be structured as sentences, but rather based on associating slots with grammatical tags.

For example, an NER component 362 may parse text data to identify words as subject, object, verb, preposition, etc. based on grammar rules and/or models prior to recognizing named entities in the text data. An IC component 364 (implemented by the same recognizer 363 as the NER component 362) may use the identified verb to identify an intent. The NER component 362 may then determine a grammar model 376 associated with the identified intent. For example, a grammar model 376 for an intent corresponding to <PlayMusic> may specify a list of slots applicable to play the identified "object" and any object modifier (e.g., a prepositional phrase), such as {Artist Name}, {Album Name}, {Song name}, etc. The NER component 362 may then search corresponding fields in a lexicon 386 associated with the speechlet 290 associated with the recognizer 363 implementing the NER component 362, attempting to match words and phrases in text data the NER component 362 previously tagged as a grammatical object or object modifier with those identified in the lexicon 386.

An NER component 362 may perform semantic tagging, which is the labeling of a word or combination of words according to their type/semantic meaning. An NER component 362 may parse text data using heuristic grammar rules, or a model may be constructed using techniques such as hidden Markov models, maximum entropy models, log linear models, conditional random fields (CRF), and the like. For example, an NER component 362 implemented by a music speechlet recognizer 363 may parse and tag text data including text corresponding to "play mother's little helper by the rolling stones" as {Verb}: "Play," {Object}: "mother's little helper," {Object Preposition}: "by," and {Object Modifier}: "the rolling stones." The NER component 362 identifies "Play" as a verb based on a word database associated with the music speechlet, which an IC component 364 (also implemented by the music speechlet recognizer 363) may determine corresponds to a <PlayMusic> intent. At this stage, no determination has been made as to the meaning of "mother's little helper" and "the rolling stones," but based on grammar rules and models, the NER component 362 has determined that the text of these phrases relates to the grammatical object (i.e., entity) of the user input represented in the text data.

The frameworks linked to the intent are then used to determine what database fields should be searched to determine the meaning of these phrases, such as searching a user's gazetteer 384 for similarity with the framework slots. For example, a framework for a <PlayMusic> intent might indicate to attempt to resolve the identified object based on {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer 384 does not resolve a slot/field using gazetteer information, the NER component 362 may search a database of generic words associated with the speechlet 290 (in the knowledge base 372). For example, if the text data includes text corresponding to "play songs by the rolling stones," after failing to determine an album name or song name called "songs" by "the rolling stones," the NER component 362 may search the speechlet vocabulary for the word "songs." In the alternative, generic words may be checked before the gazetteer information, or both may be tried, potentially producing two different results.

An NER component 362 may tag text data to attribute meaning thereto. For example, an NER component 362 may tag "play mother's little helper by the rolling stones" as: {speechlet} Music, {intent} Play Music, {artist name} rolling stones, {media type} SONG, and {song title} mother's little helper. For further example, the NER component 362 may tag "play songs by the rolling stones" as: {speechlet} Music, {intent} Play Music, {artist name} rolling stones, and {media type} SONG.

The NLU component 260 may generate cross-speechlet N-best list data 440 including the tagged text data output by each recognizer 363 (as illustrated if FIG. 4). A recognizer 363 may output tagged text data generated by an NER component 362 and an IC component 364 operated by the recognizer 363, as described herein above. Each entry of tagged text data represented in the cross-speechlet N-best list data 440 may be associated with a respective score indicating a likelihood that the entry of tagged text data corresponds to the speechlet 290 associated with the recognizer 363 from which the tagged text data was output. For example, the cross-speechlet N-best list data 440 may be represented as:

[0.95] Intent: <PlayMusic> ArtistName: Lady Gaga SongName: Poker Face

[0.95] Intent: <PlayVideo> ArtistName: Lady Gaga VideoName: Poker Face

[0.01] Intent: <PlayMusic> ArtistName: Lady Gaga AlbumName: Poker Face

[0.01] Intent: <PlayMusic> SongName: Pokerface

The NLU component 260 may send the cross-speechlet N-best list data 440 to a pruning component 450. The pruning component 450 may sort the entries of tagged text data represented in the cross-speechlet N-best list data 440 according to their respective scores. The pruning component 450 may then perform score thresholding with respect to the cross-speechlet N-best list data 440. For example, the pruning component 450 may select entries of tagged text data represented in the cross-speechlet N-best list data 440 associated with a score satisfying (e.g., meeting and/or exceeding) a threshold score. The pruning component 450 may also or alternatively perform number of tagged text data entry thresholding. For example, the pruning component 450 may select a maximum threshold number of top scoring tagged text data entries. The pruning component 450 may generate cross-speechlet N-best list data 460 including the selected tagged text data entries. The purpose of the pruning component 450 is to create a reduced list of tagged text data entries so that downstream, more resource intensive, processes may only operate on the tagged text data entries that most likely correspond to the user input.

The NLU component 260 may also include a light slot filler component 452. The light slot filler component 452 can take text from slots represented in the tagged text data entries output by the pruning component 450 and alter it to make the text more easily processed by downstream components. The light slot filler component 452 may perform low latency operations that do not involve heavy operations such as reference to a knowledge base. The purpose of the light slot filler component 452 is to replace words with other words or values that may be more easily understood by downstream system components. For example, if a tagged text data entry includes the word "tomorrow," the light slot filler component 452 may replace the word "tomorrow" with an actual date for purposes of downstream processing. Similarly, the light slot filler component 452 may replace the word "CD" with "album" or the words "compact disc." The replaced words are then included in the cross-speechlet N-best list data 460.

The NLU component 260 sends the cross-speechlet N-best list data 660 to an entity resolution component 470. The entity resolution component 470 can apply rules or other instructions to standardize labels or tokens from previous stages into an intent/slot representation. The precise transformation may depend on the speechlet 290. For example, for a travel speechlet, the entity resolution component 470 may transform text data corresponding to "Boston airport" to the standard BOS three-letter code referring to the airport. The entity resolution component 470 can refer to a knowledge base that is used to specifically identify the precise entity referred to in each slot of each tagged text data entry represented in the cross-speechlet N-best list data 460. Specific intent/slot combinations may also be tied to a particular source, which may then be used to resolve the text. In the example "play songs by the stones," the entity resolution component 470 may reference a personal music catalog, Amazon Music account, a user profile XXE02 (described herein), or the like. The entity resolution component 470 may output data including an altered N-best list that is based on the cross-speechlet N-best list data 460, and that includes more detailed information (e.g., entity IDs) about the specific entities mentioned in the slots and/or more detailed slot data that can eventually be used by a speechlet 290. The NLU component 260 may include multiple entity resolution components 470 and each entity resolution component 470 may be specific to one or more speechlets 290.

The entity resolution component 470 may not be successful in resolving every entity and filling every slot represented in the cross-speechlet N-best list data 460. This may result in the entity resolution component 470 outputting incomplete results. The NLU component 260 may include a preliminary ranker component 490. The preliminary ranker component 490 may assign a particular confidence score to each tagged text data entry input therein. The confidence score of a tagged text data entry may represent a confidence of the system in the NLU processing performed with respect to the tagged text data entry. The confidence score of a particular tagged text data entry may be affected by whether the tagged text data entry has unfilled slots. For example, if a tagged text data entry associated with a first speechlet includes slots that are all filled/resolved, that tagged text data entry may be assigned a higher confidence score than another tagged text data entry including at least some slots that are unfilled/unresolved by the entity resolution component 470.

The preliminary ranker component 490 may apply re-scoring, biasing, or other techniques to determine the top scoring tagged text data entries. To do so, the preliminary ranker component 490 may consider not only the data output by the entity resolution component 470, but may also consider other data 491. The other data 491 may include a variety of information. For example, the other data 491 may include speechlet 290 rating or popularity data. For example, if one speechlet has a high rating, the preliminary ranker component 490 may increase the score of a tagged text data entry output by a recognizer 363 associated with that speechlet. The other data 491 may also include information about speechlets that have been enabled by the user that originated the current user input. For example, the preliminary ranker component 490 may assign higher scores to tagged text data entries output by recognizers 363 associated with enabled speechlets 290 than tagged text data entries output by recognizers 363 associated with non-enabled speechlets 290. The other data 491 may also include data indicating user usage history, such as if the user that originated the current user input regularly uses a particular speechlet 290 or does so at particular times of day. The other data 491 may additionally include data indicating date, time, location, weather, type of device 110, user ID, context, as well as other information. For example, the preliminary ranker component 490 may consider when any particular speechlet 290 is currently active (e.g., music being played, a game being played, etc.).

Following preliminary ranking, the NLU component 260 may output NLU results data 485. The NLU component 260 may send the NLU results data 485 to the post-result ranker component 265, either directed or indirectly via, for example, the orchestrator component 230. The NLU results data 485 may include first NLU results data 485a including tagged text data associated with a first speechlet, second NLU results data 485b including tagged text data associated with a second speechlet, etc. The NLU results data 485 may include tagged text data corresponding to the top scoring tagged text data entries as determined by the preliminary ranker component 490.

The orchestrator component 230 may receive the NLU results data 485 from the NLU component 260 and, prior to sending the NLU results data 485 to the post-result ranker component 265, associate intents in the NLU results data 485 with speechlets 290. For example, if the NLU results data 485 includes a <PlayMusic> intent, the orchestrator component 230 may associate the NLU results data 485 with one or more speechlets 290 that can execute the <PlayMusic> intent. Thus, the orchestrator component 230 may send the NLU results data 485 paired with speechlets 290 to the post-result ranker component 265. In response to input text data corresponding to "what should I do for dinner today," the orchestrator component 230 may generate intent/speechlet pairs corresponding to:

<Help>/Speechlet 1
    <Order>/Speechlet 2
    <DishType>/Speechlet 3

The system may be configured with thousands, tens of thousands, etc. speechlets 290. The NLU component 260 may output first NLU results data 485a associated with a first speechlet 290a and second NLU results data 485b associated with a second speechlet 290b. The first NLU results data 485a may be associated with a first confidence score indicating the system's confidence with respect to NLU processing performed to generate the first NLU results data 485a. Moreover, the second NLU results data 485b may be associated with a second confidence score indicating the system's confidence with respect to NLU processing performed to generate the second NLU results data 485b. The first confidence score may be similar or identical to the second confidence score. The first confidence score and/or the second confidence score may be a numeric value (e.g., from 0.0 to 1.0). Alternatively, the first confidence score and/or the second confidence score may be a binned value (e.g., low, medium, high). The post-result ranker component 265 enables the system to better determine the best speechlet 290 to handle current user input when, for example, the NLU confidence scores of various speechlets are identical, or nearly identical.

A system that does not implement the post-result ranker component 265 may select a speechlet 290 associated with a portion of NLU results data 485 having the highest NLU processing confidence score. The system may send the portion of the NLU results data 485 to the speechlet 290 along with a request for output data. In some situations, the speechlet 290 may not be able to provide the system with output data. This results in the system indicating to the user that the user input could not be processed even though another speechlet, associated with a portion of the NLU results data associated with a lower NLU processing confidence score, could have provided output data responsive to the user input.

The post-result ranker component 265 eliminates, or nearly eliminates, the aforementioned situation. As described below, the post-result ranker component 265 queries multiple speechlets associated with NLU results data 485 to provide potential results data prior to the post-result ranker component 265 (or another component of the system) ultimately determining which the speechlet should handle the current user input. Whereas a system not implementing the post-result ranker component 265 may select a speechlet that cannot provide a response to present user input, the post-result ranker component 265 ensures (or increases the probability that) the system only selects speechlets that are capable of handling the present user input.

FIGS. 5A through 5C illustrate operation of the post-result ranker component 265. Below are described operations the post-result ranker component 265 may perform with respect to two speechlets 290 with respect to a single user input. One skilled in the art will appreciate that the post-result ranker component 265 may perform operations with respect to more than two speechlets 290, with respect to a single user input, without departing from the scope of the present disclosure.

As illustrated in FIGS. 5A through 5C, the post-result ranker component 265 receives (502) the NLU results data 485 from the NLU component 260, either directly or indirectly via the orchestrator component 230. The post-result ranker component 265 determines (504) first NLU results data 485a corresponding to a first speechlet 290a. The first NLU results data 485a may include intent data representing an action to be performed that is responsive to the user input. For example, if the user input corresponds to "Alexa, play Adele's Hello," the intent data may corresponding to a <PlayMusic> intent. The first NLU results data 485a may also include tagged text data, with the text data being tagged to attribute meaning that enables the first speechlet 290a to execute with respect to the text data. For example, for the text data "play Adele's Hello," the tagged text data may correspond to [Artist: Adele] and [SongName: Hello].

The post-result ranker component 265 sends (140) the first NLU results data 485a to the first speechlet 290a. The post-result ranker component 265 also sends (142), to the first speechlet 290a, a first instruction to provide potential results data responsive to the first NLU results data 485a. The first instruction may correspond to metadata corresponding to "'isSkillQuery': true". When the first speechlet 290a processes the "isSkillQuery" metadata, the "true" portion of the metadata indicates to the first speechlet 290a that the first speechlet 290a should provide potential results data to the post-result ranker component 265 without actually taking action (e.g., booking a ride sharing ride, etc.) to execute the command.

The first speechlet 290a determines (506) whether it is capable of operating with respect to the first NLU results data 485a. The first speechlet 290a thereafter may generate (508) first potential results data and sends (510) the first potential results data to the post-result ranker component 265.

The first potential results data may include text data indicating whether the first speechlet 290a can execute with respect to the first NLU results data 485a. Such text data may correspond to "CanFulfillRequest" followed by text data such as "no," "yes," or "maybe." "Yes" means the first speechlet 290a can execute with respect to the first NLU results data 485a, "no" means the first speechlet 290a cannot execute with respect to the first NLU results data 485a, and "maybe" means the first speechlet 290a needs more data to determine whether it can execute with respect to the first NLU results data 485a. In addition to the first potential results data including text data corresponding to "CanFulfillRequest: maybe," the first potential results data may also include an instruction and/or computer-generated speech indicating how the first speechlet 290a recommends the system solicit further information needed by the first speechlet 290a. The first potential results data may further include an indication of whether the first speechlet 290a will have all needed information after the user 5 provides additional information a single time, or whether the first speechlet 290a will need the user 5 to provide various kinds of additional information prior to the first speechlet 290a having all needed information.

The first potential results data may also include text data indicating, for each portion of tagged text (e.g., "slot") represented in the first NLU results data 485a, whether the first speechlet 290a can understand the portion of tagged text as well as whether the first speechlet 290a can execute with respect to the portion of tagged text. The first potential results data may include text data corresponding to a portion of tagged text. Such text data may be associated with text data corresponding to "canUnderstandSlot" followed by text data corresponding to either "true" or "false," with "true" representing the first speechlet 290a understands and can execute with respect to the particular portion of tagged text data and "false" representing the first speechlet 290a cannot understand and/or execute with respect to the particular portion of tagged text data. Such text data represented in the potential results data may be used to update NLU models such that NLU processing may thereafter produce better NLU results (e.g., for the speechlet that provided the potential results data). The first potential results data may also include synonyms for specific slots, which may be used for further entity resolution.

The first potential results data may also include text data indicating whether the first speechlet 290a needs a component of the server(s) 120 to call the first speechlet 290a a second time to cause the first speechlet 290a to complete a task or take actual action. Such text data may correspond to "callBackToCompleteActionToken" followed by "true" or "false," with "true" representing the first speechlet 290a needs a component of the server(s) 120 to call the first speechlet 290a a second time and "false" representing the first speechlet 290a does not need a component of the server(s) 120 to call the first speechlet 290a a second time. For example, the first potential results data may include text data corresponding to "callBackToCompleteActionToken: true" when the first speechlet 290a cannot actually take action (e.g., book a ride, purchase a flight ticket, etc.) until a component of the server(s) 120 calls the first speechlet 290a a second time, whereby the component of the server(s) 120 indicates the first speechlet 290a is to actually take action. For further example, the first potential results data may include text data corresponding to "callBackToCompleteActionToken: true" when the first speechlet 290a is capable of providing the server(s) 120 with output content which the server(s) 120 may present to a user but the first speechlet 290a does not include such output content in the first potential results data. In the aforementioned example, a component of the server(s) 120 would need to call the first speechlet 290a a second time for the first speechlet 290a to provide to server(s) 120 with output content responsive to the current user input. For yet further example, the first potential results data may include text data corresponding to "callBackToCompleteActionToken: false" when the first speechlet 290a provides output content in the first potential results data. According to the aforementioned example, there is no need to call the first speechlet 290a a second time since output content responsive to the current user input is provided in the first potential results data.

In an example, potential results data may not include callBackToCompleteActionToken text. In such an example, the system may determine whether it needs to re-call the selected speechlet 290 based on other data provided by the speechlet 290. For example, if the speechlet provided output data including content to be output to a user, the system may determine it does not need to re-call the speechlet 290. Conversely, if the speechlet 290 simply provides data indicating the speechlet 290 can handle the user command, the system may determine it needs to re-call the speechlet 290.

In some instances, the first potential results data may include text data corresponding to context information. The context information represents the processing that the first speechlet 290a performed to generate the first potential results data. If the post-result ranker 265 determines the first speechlet 290a is the highest ranked speechlet, the post-result ranker 265 may send to the first speechlet 290a, along with an instruction to execute, data representing the context information. This enables the first speechlet 290a to recommence processing where the first speechlet 290a finished its initial processing. This helps mitigate latency that would be caused if the first speechlet 290a had to commence the second round of processing from the very beginning.

The first potential results data may also include an instruction. For example, if the user input corresponds to "turn on the light," the first potential results data may include an instruction causing the system to turn on a light associated with a profile of the device (110a/110b) and/or user 5.

The post-result ranker component 265 also determines (512) second NLU results data 485b corresponding to a second speechlet 290b. The second NLU results data 485b may include intent data representing an action to be performed that is responsive to the user input. The second NLU results data 485a may also include tagged text data, with the text data being tagged to attribute meaning that enables the second speechlet 290b to execute with respect to the text data.

The post-result ranker component 265 sends (146) the second NLU results data 485b to the second speechlet 290b. The post-result ranker component 265 also sends (148), to the second speechlet 290b, a second instruction to provide potential results data responsive to the second NLU results data 485b. The second instruction may correspond to metadata corresponding to "'isSkillQuery': true". When the second speechlet 290b processes the "isSkillQuery" metadata, the "true" portion of the metadata indicates to the second speechlet 290b that the second speechlet 290b should provide potential results data to the post-result ranker component 265, without actually taking action (e.g., booking a ride, etc.).

The second speechlet 290b determines (514) whether it is capable of operating with respect to the second NLU results data 485b. The second speechlet 290b thereafter generates (516) second potential results data. The second potential results data may include various types of text and other data as described above with respect to the first potential results data. The second speechlet 290b sends (518) the second potential results data to the post-result ranker component 265.

As described, the post-result ranker 265 queries speechlets 290 for potential results data. The server(s) 120 may alternatively include a separate component that queries speechlets 290 for potential results data and that provides received potential results data, of queried speechlets 290, to the post-result ranker component 265.

The post-result ranker component 265 receives (520) other data as described below. The post-result ranker component 265 generates (522), for the first speechlet 290a, a first post-result score based on a first NLU confidence score associated with the first speechlet 290a, the first potential results data, and other data (if received). The post-result ranker component 265 also generates (524), for the second speechlet 290b, a second post-result score based on a second NLU confidence score associated with the second speechlet 290b, the second potential results data, and other data (if received). The post-result ranker component 265 may also consider the text data input to the NLU component 260 in determining the first and second post-result scores. The post-result ranker component 265 may determine a post-result score for each speechlet 290 represented in the NLU results data 485 output by the NLU component 260, or a portion thereof.

The first post-result score represents the post-result ranker's confidence that the first speechlet 290a should handle the current user input. Likewise, the second post-result score represents the post-result ranker's confidence that the second speechlet 290b should handle the current user input. One skilled in the art will appreciate that a first difference between the NLU confidence score associated with the first speechlet 290a and the NLU confidence score associated with the second speechlet 290b may be greater than a second difference between the first post-result score and the second post-result score. That is, the post-result ranker component 265 disambiguates speechlets associated with similar or identical NLU confidence scores to better determine which speechlet 290 should handle the current user input. Without the post-result ranker component 265, the system may not be confident enough to determine which speechlet 290 should handle the current user input.

The post-result ranker component 265 may include a statistical component that produces a ranked list of intent/speechlet pairs with associated respective post-result scores. Each post-result score may indicate an adequacy of the speechlet's execution of the intent with respect to NLU results data associated with the speechlet. The post-result ranker component 265 may operate one or more trained models that are configured to process NLU confidence scores, potential results data, and other data in order to determine which speechlet should handle the current user input. The post-result ranker component 265 may output data including an N-best list where the entries in the N-best list are reordered from the entries in the NLU results data 485 such that the N-best list output by the post-result ranker component 265 represents a prioritized list of speechlets to handle a current user input as determined by the post-result ranker component 265. The output of the post-result ranker component 265 may also include (either as part of an N-best list or otherwise) individual respective post-result scores corresponding to speechlets 290 where each post-result score indicates a confidence that the respective speechlet should handle the current user input.

The model(s) of the post-result ranker component 265 may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply machine learning techniques, machine learning processes themselves need to be trained. Training a machine learning component, such as the post-result ranker component 265, requires establishing a "ground truth" for training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

The post-result ranker component 265 may provide higher scores to speechlets 290 that provide potential results data that indicate a speechlet 290 can execute with respect to the current user input over speechlets 290 that provide potential results data indicating the speechlet 290 is unsure whether it can execute. For example, the post-result ranker component 265 may generate a first post-result score (or increase the first post-result score) for the first speechlet 290a based on the first potential results data indicating the first speechlet 290a can execute with respect to the current user input, and may generate a second, lower post-result score (or decrease the second post-result score) for the second speechlet 290b based on the second potential results data indicating further information is needed for the second speechlet 290b to execute (or the second speechlet 290b is capable of providing multiple responses to the second NLU results data 485b).

The post-result ranker component 265 may consider other data indicating rankings associated with speechlets 290. A ranking may be a system ranking or a user specific ranking. A ranking may indicate a veracity of a speechlet 290 from the perspective of one or more users of the system. For example, the post-result ranker component 265 may generate a first post-result score (or increase the first post-result score) for the first speechlet 290a based on the first speechlet 290a being associated with a first ranking, and may generate a second, lower post-result score (or decrease the second post-result score) for the second speechlet 290b based on the second speechlet 290b being associated with a second, lower ranking.

The post-result ranker component 265 may also consider other data indicating whether or not the user that originated the current input has enabled one or more speechlets 290. For example, the post-result ranker component 265 may generate a first post-result score (or increase the first post-result score) for the first speechlet 290a based on the first speechlet 290a being enabled by the user that originated the current input, and may generate a second, lower post-result score (or decrease the second post-result score) for the second speechlet 290b based on the second speechlet 290b not being enabled by the user.

A user may provide the system with indications of which skills are enabled (e.g., authorized to execute using data associated with the user). Such indications may be stored in the user profile storage 270. When the post-result ranker component 265 receives the NLU results data 485, the post-result ranker component 265 may determine whether profile data associated with the user and/or device that originated the current user input includes data indicating enabled skills.

The post-result ranker component 265 may also consider other data indicating output capabilities of a device that will be used to output content responsive to the current user input. The system may be configured with devices that include speakers but not displays, devices that include displays but not speakers, and devices that include speakers and displays. If the device that will output content responsive to the current user input includes one or more speakers but not a display, the post-result ranker component 265 may increase the post-result score associated with a speechlet configured to output audible content (e.g., audio data and/or text data that may undergo text-to-speech processing) and/or decrease the post-result score associated with a speechlet configured to output visual content (e.g., image data and/or video data). If the device that will output content responsive to the current user input includes a display but not one or more speakers, the post-result ranker component 265 may increase the post-result score associated with a speechlet configured to output visual and/or decrease the post-result score associated with a speechlet configured to output audible content.

The post-result ranker component 265 may also consider other data indicating the dependability of the output data provided by a speechlet 290. For example, if a user says "tell me a recipe for pasta sauce," the first speechlet 290a may provide the post-result ranker component 265 with first potential results data corresponding to a first recipe associated with a five (5) star rating and the second speechlet 290b may provide the post-result ranker component 265 with second potential results data corresponding to a second recipe associated with a one (1) star rating. In this situation, the post-result ranker component 265 may generate a first post-result score (or increase the first post-result score) for the first speechlet 290a based on the first potential results data being associated with the five (5) star rating and/or generate a second, lower post-result score (or decrease the second post-result score) for the second speechlet 290b based on the second potential results data being associated with the one (1) star rating.

The post-result ranker component 265 may also consider other data indicating the type of device that originated the current user input. For example, the device may correspond to a "hotel room" type if the device is located in a hotel room. If a user inputs a command corresponding to "order me food" to the device located in the hotel room, the post-result ranker component 265 may generate a first post-result score (or increase the first post-result score) for the first speechlet 290a corresponding to a room service speechlet associated with the hotel and/or generate a second, lower post-result score (or decrease the second post-result score) for the second speechlet 290b corresponding to a food speechlet not associated with the hotel.

The post-result ranker component 265 may also consider other data indicating a location of the device and/or user that originated the current user input. The system may be configured with speechlets 290 that may only operate with respect to certain geographic locations. For example, a user may provide input corresponding to "when is the next train to Portland." The first speechlet 290a may operate with respect to trains that arrive at, depart from, and pass through Portland, Oreg. The second speechlet 290b may operate with respect to trains that arrive at, depart from, and pass through Portland, Me. If the device and/or user that originated the current input is located in Seattle, Wash., the post-result ranker component 265 generate a first post-result score (or increase the first-result score) for the first speechlet 290a and/or generate a second, lower post-result score (or decrease the second post-result score) for the second speechlet 290b. Likewise, if the device and/or user that originated the command is located in Boston, Mass., the post-result ranker component 265 may generate a second post-result score (or increase the second post-result score) for the second speechlet 290*b* and/or generate a first, lower post-result score (or decrease the first post-result score) for the first speechlet 290*a*.

The post-result ranker component 265 may also consider other data indicating a time of day. The system may be configured with speechlets 290 that operate with respect to certain times of day. For example, a user may input to the system "order me food." The first speechlet 290*a* may be a breakfast speechlet. The second speechlet 290*b* may be a dinner speechlet. If the user inputs "order me food" to the system in the morning, the post-result ranker component 265 may generate a first post-result score (or increase the first post-result score) for the first speechlet 290*a* and/or generate a second, lower post-result score (or decrease the second post-result score) for the second speechlet 290*b*. If the user inputs "order me food" to the system in the afternoon or evening, the post-result ranker component 265 may generate a second post-result score (or increase the second post-result score) for the second speechlet 290*b* and/or generate a first, lower post-result score (or decrease the first post-result score) for the first speechlet 290*a*.

The post-result ranker component 265 may also consider other data indicating user preferences. The system may include multiple speechlets 290 configured to execute in substantially the same manner. For example, the first speechlet 290*a* and the second speechlet 290*b* may each be configured to order food from respective restaurants. The system may store user preference data (e.g., in the user profile storage 270) that is associated with the user 5 and that indicates the user 5 prefers the first speechlet 290*a*. Thus, when the user 5 inputs a command that may be executed by both the first speechlet 290*a* and the second speechlet 290*b*, the post-result ranker component 265 may generate a first post-result score (or increase the first post-result score) for the first speechlet 290*a* and/or generate a second, lower post-result score (or decrease the second post-result score) for the second speechlet 290*b*.

The post-result ranker component 265 may also consider other data indicating system processing history data associated with the user that originated the current user input. For example, the system processing history data may indicate the user 5 inputs commands that invoke the first speechlet 290*a* more often than the user 5 inputs commands that invoke the second speechlet 290*b*. Based on this, if a presently input command originating from the user 5 may be executed by both the first speechlet 290*a* and the second speechlet 290*b*, the post-result ranker component 265 may generate a first post-result score (or increase the first post-result score) for the first speechlet 290*a* and/or generate a second, lower post-result score (or decrease the second post-result score) for the second speechlet 290*b*.

The post-result ranker component 265 may also consider other data indicating a speed at which the device 110 that originated the current user input is traveling. For example, the device 110 may be located in a moving vehicle, or may be a moving vehicle. When a device 110 is in motion, the system may be configured to give higher scores to audible outputs rather than visual outputs to decrease the likelihood of distracting an operator of a vehicle. Thus, for example, if the device 110 that originated the current user input is moving at or above a threshold speed (e.g., a speed above an average user's walking speed), the post-result ranker component 265 may generate a first post-result score (or increase the first post-result score) for a first speechlet 290*a* that generates output audio data (or output text data that can be converted into output audio data using TTS processing) and/or generate a second, lower post-result score (or decrease the second post-result score) for a second speechlet 290*b* that generates output image data or output video data.

The post-result ranker component 265 may also consider other data indicating how long it took a speechlet 290 to provide potential results data to the post-result ranker component 265. When the post-result ranker component 265 requests potential results data from multiple speechlets 290, the speechlets 290 may respond to the requests at different speeds. The post-result ranker component 265 may implement a latency budget. For example, if first speechlet 290*a* responds to the post-result ranker component 265 within a threshold amount of time from receiving a request and the second speechlet 290*b* does not respond to the post-result ranker component 265 within the threshold amount of time, the post-result ranker component 265 may generate a first post-result score (or increase the first post-result score) for the first speechlet 290*a* and/or may generate a second, lower post-result score (or decrease the second post-result score) for the second speechlet 290*b*.

It has been described that the post-result ranker component 265 uses other data to generate or increase/decrease post-result ranker scores associated with various speechlets 290 that the post-result ranker component 265 has already requested potential results data from. Alternatively, the post-result ranker component 265 may use the other data to determine which speechlets 290 to request potential results data from. For example, the post-result ranker component 265 may use the other data to increase and/or decrease NLU processing confidence scores associated with speechlets 290 associated with the NLU results data 485 output by the NLU component 260. The post-result ranker component 265 may select speechlets 290 associated with N number of top scoring altered NLU processing confidence scores to request potential results data from.

As indicated above, the post-result ranker component 265 may request potential results data from multiple speechlets 290. If one of the speechlets provides potential results data including data responsive to received NLU results data and the remaining queried speechlets provide potential results data indicating either the speechlets cannot execute with respect to received NLU results data or the speechlets are unsure whether they can execute with respect to received NLU results data, the post-result ranker component 265 may select the speechlet that provided the potential results data including the data response to received NLU results data as the speechlet to handle the current user input.

The post-result ranker component 265 may output (526) data indicating the speechlet associated with the highest post-result score, or indicating multiple speechlets associated with respect post-result scores. If the speechlet 290 associated with the highest post-result score provided the post-result ranker component 265 with output data (corresponding to content that may be output to the user 5) as part of the potential results data, the post-result ranker component 265 (or another component of the server(s) 120, such as the orchestrator component 230) may cause the device 110*a* and/or the device 110*b* to output content corresponding to the output data. If the output data, provided as part of the potential results data, is not in the form needed for output to the user, the system may perform operations to convert the output data into the needed data (e.g., may perform TTS on output text data to generate output audio data).

The system may send the one or more unchosen speechlets 290 a <SessionEndedRequest>. The system may also send each unchosen speechlet 290 a reason why it was not chosen. The aforementioned data sent to the unchosen speechlets 290 may cause the speechlets 290 to set <notifyIfNotChosen> values to "true." This may results in each unchosen speechlet(s) 290 releasing its current session with the system, thereby clearing up bandwidth for a new session to be commenced therewith.

The speechlet 290 associated with the highest post-result score may provide the post-result ranker component 265 with potential results data, indicating more information is needed, as well as instruction data. The instruction data may indicate how the speechlet 290 recommends the system obtain the needed information. For example, the instruction data may correspond to text data or audio data (i.e., computer generated speech) corresponding to "please indicate _____." The instruction data may be in a format (e.g., text data or audio data) capable of being output by the device (110a/110b). When this occurs, the post-result ranker component 265 (or another component of the server(s) 120, such as the orchestrator component 230) may cause the received instruction data be output by one or more devices (110a/110b). Alternatively, the instruction data may be in a format that is not capable of being output by the device (110a/110b). When this occurs, the post-result ranker component 265 (or another component of the server(s) 120, such as the orchestrator component 230) may cause the ASR component 250 or the TTS component 280 to process the instruction data, depending on the situation, to generate instruction data that may be output by the device (110a/110b). Once the user provides the system with all further information needed by the speechlet 290, the speechlet 290 may actually execute to provide the user with information and/or perform some action (e.g., book a ride, etc.).

If the post-result ranker component 265 (or another component of the server(s) 120, such as the orchestrator component 230) selects a speechlet that is to perform an action (e.g., book a ride, etc.) to handle the current user input, the system may solicit the user for an indication that the system is permitted to cause the speechlet to actually handle the current user input (e.g., actually perform the action). The user provided indication may be an audible indication or a tactile indication (e.g., activation of a virtual button or input of text via a virtual keyboard). In response to receiving the user provided indication, the system may provide the speechlet with data corresponding to the indication. In response, the speechlet may execute (e.g., book a flight, book a train ticket, etc.). Thus, while the system may not further engage a speechlet after the speechlet provides the post-result ranker component 265 with content outputtable to a user, the system may further engage another speechlet after the speechlet provides the post-result ranker component 265 with an indication that the speechlet needs to be re-called so the speechlet can perform an action (e.g., book a ride sharing ride) responsive to the user input.

In some instances, the post-result ranker component 265 may generate respective post-result scores for first and second speechlets that are too close (e.g., are not different by at least a threshold difference) for the post-result ranker component 265 (or another component of the server(s) 120, such as the orchestrator component 230) to make a confident determination regarding which speechlet should handle the current user input. When this occurs, the system may solicit the user 5 regarding which speechlet the user prefers to handle the current user input. The system may output TTS generated speech to the user to solicit which speechlet the user wants to handle the current user input.

The system may cache potential results data received from a speechlet with respect to an intent and specific tagged text data output by the NLU component 260. Thereafter, when the NLU component 260 outputs the same intent with the same types of tagged text data and which is associated with the same speechlet, the post-result ranker component 265 may identify the cached potential results data instead of again querying the speechlet. The post-result ranker component 265 may then user the identified potential results data to determine a post-result score. This may reduce latency experienced in querying a speechlet for potential results data.

The system may maintain history data representing the particularities of potential results data received from specific speechlets over time. During offline time periods, the system may train machine learning models, which are implemented by the post-result ranker component 265 at runtime, to consider such history data when determining post-result scores.

Figure 6:
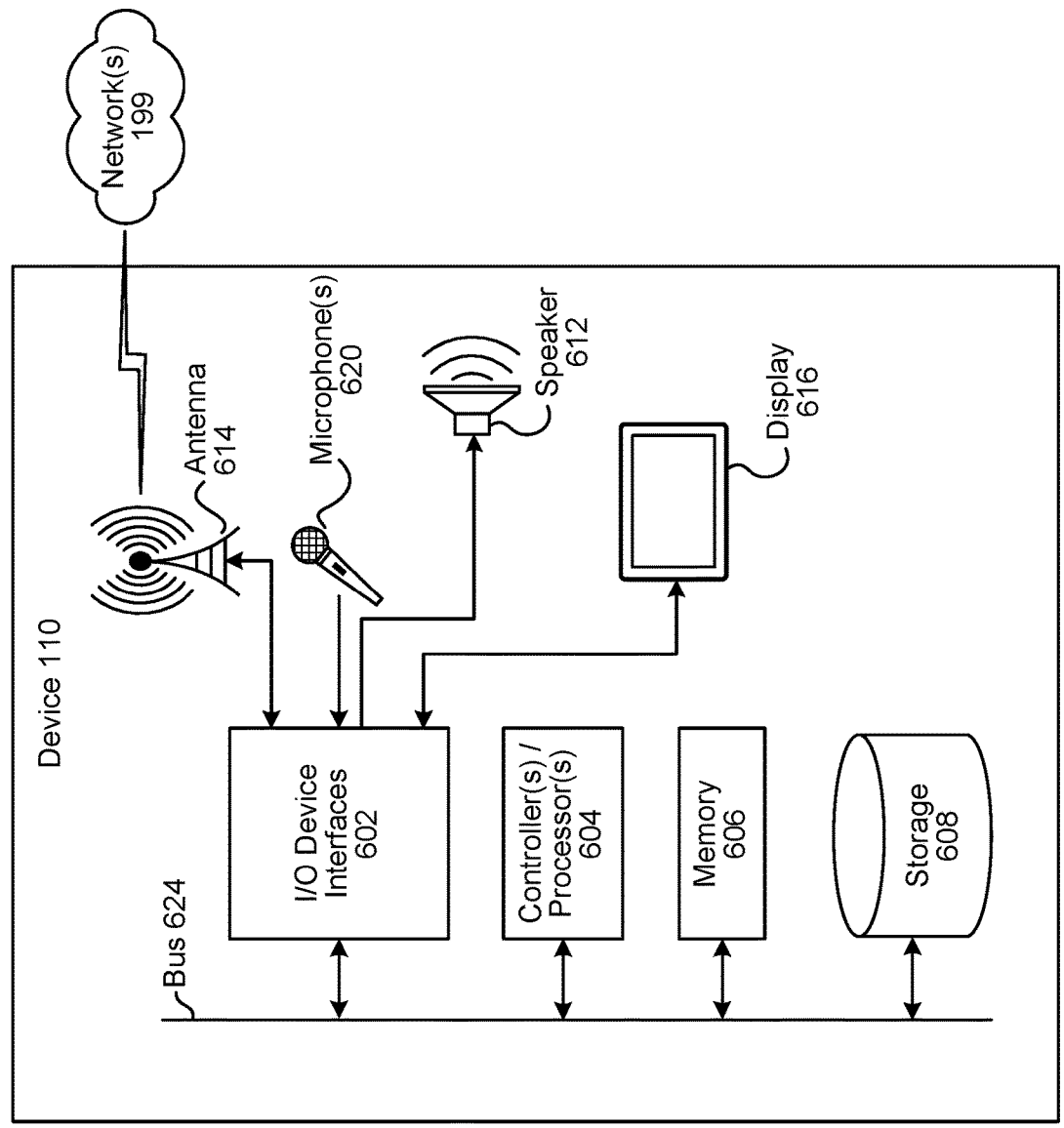
FIG. 6 is a block diagram conceptually illustrating example components of a device according to embodiments of the present disclosure.
Figure 7:
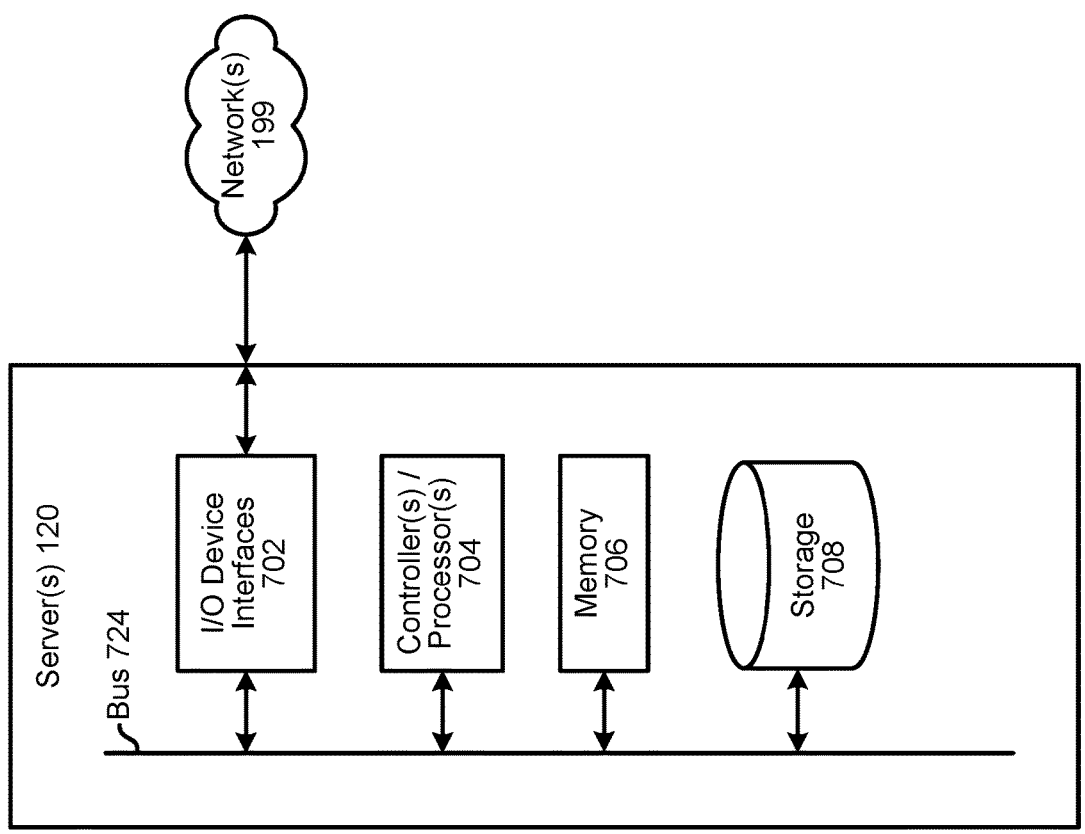
FIG. 7 is a block diagram conceptually illustrating example components of a server according to embodiments of the present disclosure.

FIG. 6 is a block diagram conceptually illustrating a device 110 that may be used with the system. FIG. 7 is a block diagram conceptually illustrating example components of a remote device, such as the server(s) 120, which may assist with ASR processing, NLU processing, etc. Multiple servers 120 may be included in the system, such as one or more servers 120 for performing ASR processing, one or more servers 120 for performing NLU processing, etc. In operation, each of these devices (or groups of devices) may include computer-readable and computer-executable instructions that reside on the respective device (110/120), as will be discussed further below.

Each of these devices (110/120) may include one or more controllers/processors (604/704), which may each include a central processing unit (CPU) for processing data and computer-readable instructions, and a memory (606/706) for storing data and instructions of the respective device. The memories (606/706) may individually include volatile random access memory (RAM), non-volatile read only memory (ROM), non-volatile magnetoresistive memory (MRAM), and/or other types of memory. Each device (110/120) may also include a data storage component (608/708) for storing data and controller/processor-executable instructions. Each data storage component (608/708) may individually include one or more non-volatile storage types such as magnetic storage, optical storage, solid-state storage, etc. Each device (110/120) may also be connected to removable or external non-volatile memory and/or storage (such as a removable memory card, memory key drive, networked storage, etc.) through respective input/output device interfaces (602/702).

Computer instructions for operating each device (110/120) and its various components may be executed by the respective device's controller(s)/processor(s) (604/704), using the memory (606/706) as temporary "working" storage at runtime. A device's computer instructions may be stored in a non-transitory manner in non-volatile memory (606/706), storage (608/708), or an external device(s). Alternatively, some or all of the executable instructions may be embedded in hardware or firmware on the respective device in addition to or instead of software.

Each device (110/120) includes input/output device interfaces (602/702). A variety of components may be connected through the input/output device interfaces (602/702), as will be discussed further below. Additionally, each device (110/120) may include an address/data bus (624/724) for conveying data among components of the respective device. Each component within a device (110/120) may also be directly connected to other components in addition to (or instead of) being connected to other components across the bus (624/724).

Referring to FIG. 6, the device 110 may include input/output device interfaces 602 that connect to a variety of components such as an audio output component such as a speaker 612, a wired headset or a wireless headset (not illustrated), or other component capable of outputting audio. The device 110 may also include an audio capture component. The audio capture component may be, for example, a microphone 620 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 616 for displaying content.

Via antenna(s) 614, the input/output device interfaces 602 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (602/702) may also include communication components that allow data to be exchanged between devices such as different physical servers in a collection of servers or other components.

The components of the device(s) 110 and the server(s) 120 may include their own dedicated processors, memory, and/or storage. Alternatively, one or more of the components of the device(s) 110 and the server(s) 120 may utilize the I/O interfaces (602/702), processor(s) (604/704), memory (606/706), and/or storage (608/708) of the device(s) 110 and server(s) 120, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110 and the server(s) 120, as described herein, are illustrative, and may be located as a stand-alone device or may be included, in whole or in part, as a component of a larger device or system.

Figure 8:
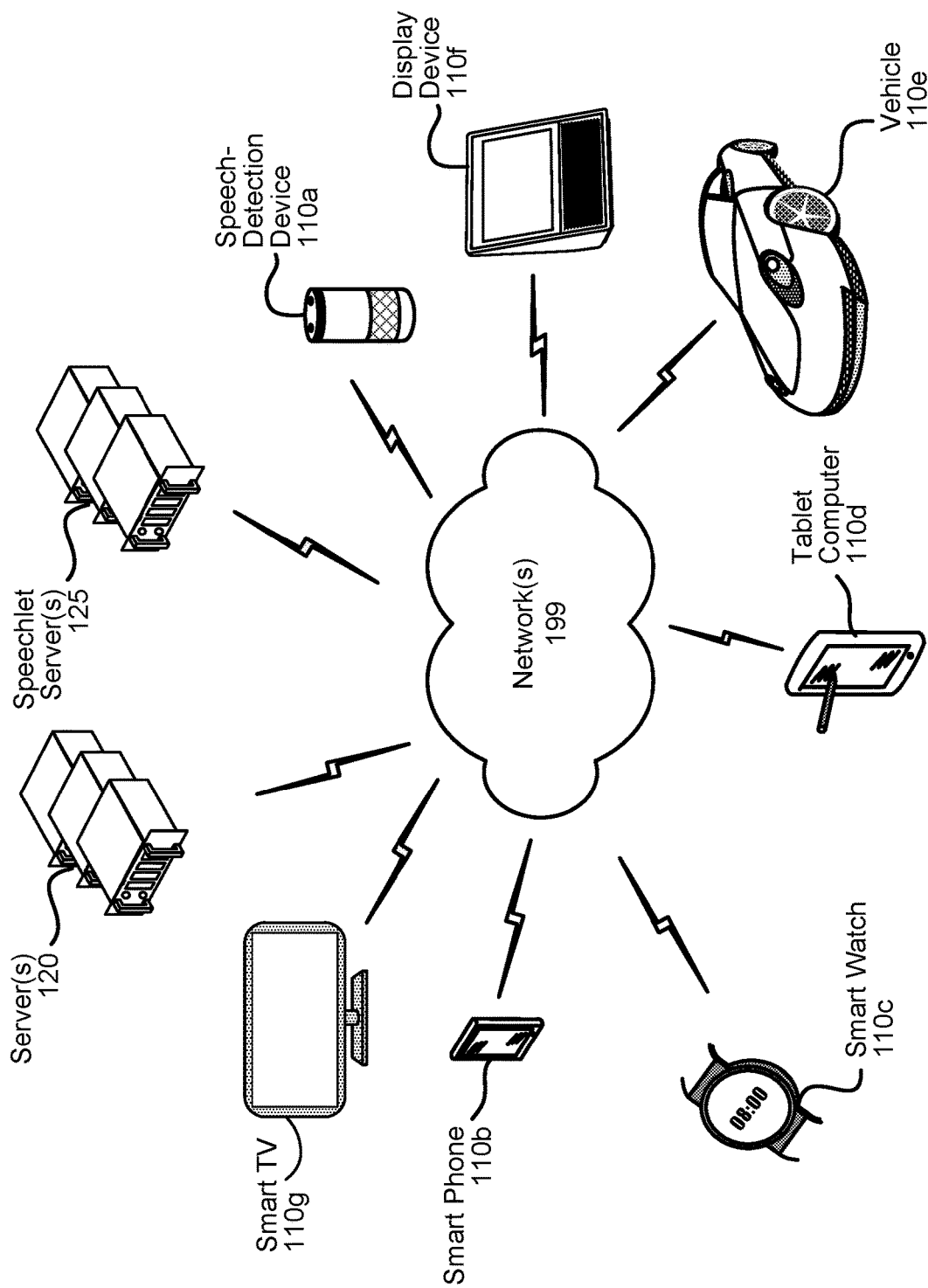
FIG. 8 illustrates an example of a computer network for use with the speech processing system.

As illustrated in FIG. 8, multiple devices (110a-110g, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, and/or a smart television 110g may be connected to the network(s) 199 through a wireless service provider, over a WiFi or cellular network connection, or the like. Other devices are included as network-connected support devices, such as the server(s) 120, the speechlet server(s) 125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of one or more servers 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
receiving, from a device, first audio data corresponding to a first utterance;
performing automatic speech recognition (ASR) processing on the first audio data to generate ASR output data;
performing natural language understanding (NLU) processing on the ASR output data to generate:
first NLU results data associated with a first component configured to perform at least a first function responsive to utterances, and
second NLU results data associated with a second component configured to perform at least a second function responsive to utterances;
sending the first NLU results data to the first component;
receiving, from the first component, first data representing a first ability of the first component to perform the at least first function based on the first NLU results data;
sending the second NLU results data to the second component;
receiving, from the second component, second data representing a second ability of the second component to perform the at least second function based on the second NLU results data;
based at least in part on the first data and the second data, determining the first component is more likely to perform a first user-intended function responsive to the first utterance than the second component; and
sending, to the first component, a first command to perform the at least first function.

2. The computer-implemented method of claim 1, further comprising determining the first data comprises:
a first portion representing the first component is capable of performing the at least first function in response to processing the first NLU results data.

3. The computer-implemented method of claim 1, further comprising:
receiving, from the first component, third data representing processing the first component performed with respect to the first NLU results data,
wherein sending the first command comprises sending the third data to the first component.

4. The computer-implemented method of claim 1, further comprising:
determining a first NLU confidence score corresponding to the first NLU results data; and
based at least in part on the first NLU confidence score and the first data, determining a first score representing a likelihood that the first component will perform the first user-intended function.

5. The computer-implemented method of claim 1, further comprising:
receiving, from the device, second audio data representing a second utterance;
determining third NLU results data representing the second utterance, the third NLU results data being associated with the first component;
determining fourth NLU results data representing the second utterance, the fourth NLU results data being associated with the second component;
sending the third NLU results data to the first component;
receiving, from the first component, third data representing a third ability of the first component to perform the at least first function in response to the second utterance;
sending the fourth NLU results data to the second component;
receiving, from the second component, fourth data representing a fourth ability of the second component to perform the at least second function in response to the second utterance;
based at least in part on the third data and the fourth data, determining the first component is more likely to perform a second user-intended function responsive to the second utterance than the second component;
determining the third data includes fifth data representing a result of the first component processing the third NLU results data;
determining the third data indicates it is unnecessary to send a second command to cause the first component to perform the at least first function; and
sending the fifth data to the device for output.

6. The computer-implemented method of claim 1, further comprising:
in association with receiving the first data, receiving, from the first component, third data indicating the first component is to receive the first command to cause the first component to perform the first user-intended function.

7. A system comprising:
at least one processor; and
at least one memory including instructions that, when executed by the at least one processor, cause the system to:
receive, from a device, first data representing a first natural language input;
determine first natural language understanding (NLU) results data representing the first natural language input, the first NLU results data being associated with a first component;
determine second NLU results data representing the first natural language input, the second NLU results data being associated with a second component;
send the first NLU results data to the first component;
receive, from the first component, second data representing a first ability of the first component to perform a first function responsive to the first natural language input;
send the second NLU results data to the second component;
receive, from the second component, third data representing a second ability of the second component to perform a second function responsive to the first natural language input;
based at least in part on the second data and the third data, determine the first component is more likely to perform a first user-intended function responsive to the first natural language input than the second component; and
send, to the first component, a first command to perform the first function.

8. The system of claim 7, wherein the second data indicates the first component is capable of executing with respect to the first NLU results data.

9. The system of claim 7, wherein the at least one memory further includes instructions that, when executed by the at least one processor, further cause the system to:
- determine a first NLU confidence score corresponding to the first NLU results data; and
- based at least in part on the first NLU confidence score and the second data, determine a first score representing a likelihood that the first component will perform the first user-intended function.

10. The system of claim 7, wherein the at least one memory further includes instructions that, when executed by the at least one processor, further cause the system to:
- receive, from the device, fourth data representing a second natural language input;
- determine third NLU results data representing the second natural language input, the third NLU results data being associated with the first component;
- determine fourth NLU results data representing the second natural language input, the fourth NLU results data being associated with the second component;
- send the third NLU results data to the first component;
- receive, from the first component, fifth data representing a third ability of the first component to perform the first function in response to the second natural language input;
- send the fourth NLU results data to the second component;
- receive, from the second component, sixth data representing a fourth ability of the second component to perform the second function in response to the second natural language input;
- based at least in part on the fifth data and the sixth data, determine the first component is more likely to perform a second user-intended function responsive to the second natural language input than the second component;
- determine the fifth data includes seventh data representing a result of the first component processing the third NLU results data;
- determine the fifth data indicates it is unnecessary to send a second command to cause the first component to perform the first function; and
- send the seventh data to the device for output.

11. The system of claim 7, wherein the at least one memory further includes instructions that, when executed by the at least one processor, further cause the system to:
- receive, from the first component, fourth data representing processing the first component performed with respect to the first NLU results data,
- wherein sending the first command comprises sending the fourth data to the first component.

12. The system of claim 7, wherein the at least one memory further includes instructions that, when executed by the at least one processor, further cause the system to:
- in association with receiving the second data, receive, from the first component, fourth data indicating the first component is to receive the first command to cause the first component to perform the first user-intended function.

13. The system of claim 7, wherein the instructions to send the first NLU results data to the first component further includes instructions that, when executed by the at least one processor, further cause the system to send first intent data to the first component.

14. A computer-implemented method comprising:
- receiving, from a device, first data representing a first natural language input;
- determining first natural language understanding (NLU) results data representing the first natural language input, the first NLU results data being associated with a first component;
- determining second NLU results data representing the first natural language input, the second NLU results data being associated with a second component;
- sending the first NLU results data to the first component;
- receiving, from the first component, second data representing a first ability of the first component to perform a first function responsive to the first natural language input;
- sending the second NLU results data to the second component;
- receiving, from the second component, third data representing a second ability of the second component to perform a second function responsive to the first natural language input;
- based at least in part on the second data and the third data, determining the first component is more likely to perform a first user-intended function responsive to the first natural language input than the second component; and
- sending, to the first component, a first command to perform the first function.

15. The computer-implemented method of claim 14, wherein the second data indicates the first component is capable of executing with respect to the first NLU results data.

16. The computer-implemented method of claim 14, further comprising:
- determining a first NLU confidence score corresponding to the first NLU results data; and
- based at least in part on the first NLU confidence score and the second data, determining a first score representing a likelihood that the first component will perform the first user-intended function.

17. The computer-implemented method of claim 14, further comprising:
- receiving, from the device, fourth data representing a second natural language input;
- determining third NLU results data representing the second natural language input, the third NLU results data being associated with the first component;
- determining fourth NLU results data representing the second natural language input, the fourth NLU results data being associated with the second component;
- sending the third NLU results data to the first component;
- receiving, from the first component, fifth data representing a third ability of the first component to perform the first function in response to the second natural language input;
- sending the fourth NLU results data to the second component;
- receiving, from the second component, sixth data representing a fourth ability of the second component to perform the second function in response to the second natural language input;
- based at least in part on the fifth data and the sixth data, determining the first component is more likely to perform a second user-intended function responsive to the second natural language input than the second component;
- determining the fifth data includes seventh data representing a result of the first component processing the third NLU results data;

determining the fifth data indicates it is unnecessary to send a second command to cause the first component to perform the first function; and sending the seventh data to the device for output.

18. The computer-implemented method of claim 14, further comprising:

receiving, from the first component, fourth data representing processing the first component performed with respect to the first NLU results data, wherein sending the first command comprises sending the fourth data to the first component.

19. The computer-implemented method of claim 14, further comprising:

in association with receiving the second data, receiving, from the first component, eighth data indicating the first component is to receive the first command to cause the first component to perform the first user-intended function.

20. The computer-implemented method of claim 14, wherein sending the first NLU results data to the first component further comprises sending first intent data to the first component.

\* \* \* \* \*